US011684026B2

(12) United States Patent
Daios et al.

(10) Patent No.: US 11,684,026 B2
(45) Date of Patent: *Jun. 27, 2023

(54) VENTILATED ELONGATED SHEET WITH WELDED COVER CONFIGURED TO COVER CULTIVATED PLANTS

(71) Applicant: Asterios Daios, Naoussa (GR)

(72) Inventors: Asterios Daios, Naoussa (GR); Dimitrios Daios, Salonika (GR)

(73) Assignee: Asterios DAIOS, Naoussa (GR)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,289

(22) Filed: Aug. 20, 2021

(65) Prior Publication Data

US 2022/0167569 A1 Jun. 2, 2022

(30) Foreign Application Priority Data

Nov. 27, 2020 (EP) .................................... 20210283

(51) Int. Cl.
*A01G 13/02* (2006.01)

(52) U.S. Cl.
CPC ..... *A01G 13/0206* (2013.01); *A01G 13/0231* (2013.01)

(58) Field of Classification Search
CPC .................. A01G 13/0206; A01G 13/0231
See application file for complete search history.

(56) References Cited

U.S. PATENT DOCUMENTS

| 4,285,162 A | 8/1981 | Hilton |
| 2015/0201565 A1 | 7/2015 | Toye |
| 2018/0054980 A1 | 3/2018 | Marques |

(Continued)

FOREIGN PATENT DOCUMENTS

| CN | 104255338 A | 1/2015 |
| EP | 3172961 A1 | 5/2017 |

(Continued)

OTHER PUBLICATIONS

European Search Report for European Application No. 20210283.6, completed May 18, 2021.

(Continued)

*Primary Examiner* — Jessica B Wong
(74) *Attorney, Agent, or Firm* — Jason H. Vick; Sheridan Ross, PC

(57) ABSTRACT

The present invention concerns an elongated sheet (1) for covering agricultural cultivated plants (2), with a basic film (3) of plastic, wherein a ventilation area (5) extending in the longitudinal sheet direction (L) and having a plurality of ventilation openings (6) is provided in the central area (4) of the basic film (3), wherein a cover film (9) of plastic extending in the longitudinal sheet direction (L) of the basic film (3) is applied to the ventilation area (5), forming free spaces (11) for air exchange, and is firmly welded to the basic film (3) over a plurality of connection areas (10) following one another in the longitudinal sheet direction (L), and wherein the connection area (10) is designed to be inclined, at least in some areas, with respect to a weld start point (12) and a weld end point (13) with respect to the cross direction (Q) extending orthogonally to the longitudinal sheet direction (L).

16 Claims, 12 Drawing Sheets

(56) References Cited

U.S. PATENT DOCUMENTS

2019/0053440 A1    2/2019  Lysak
2019/0059244 A1    2/2019  Toye
2022/0167570 A1*  6/2022  Daios ................. A01G 13/0206

FOREIGN PATENT DOCUMENTS

FR          3043887 A1    5/2017
GR          1002542 B     1/1997
GR          1004440 B     2/2004

OTHER PUBLICATIONS

European Search Report for European Application No. 20210289.3, completed Apr. 6, 2021.
Office Action for U.S. Appl. No. 17/407,337, dated Jul. 22, 2022.
Office Action for U.S. Appl. No. 17/407,337, dated Nov. 8, 2022.
Office Action for U.S. Appl. No. 17/407,337, dated Sep. 15, 2022.
Office Action for U.S. Appl. No. 17/407,337, dated Feb. 22, 2023.
Office Action for U.S. Appl. No. 17/407,337, dated April 7, 2023.

* cited by examiner

VENTILATED ELONGATED SHEET WITH WELDED COVER CONFIGURED TO COVER CULTIVATED PLANTS

CROSS-REFERENCE TO RELATED APPLICATIONS

This application claims the benefit under 35 U.S.C. 119(a) to European Patent Application No. 20 210 283.6, filed 27 Nov. 2020, the disclosure of which is incorporated herein by reference in its entirety.

The present invention concerns an elongated sheet for covering agricultural cultivated plants, especially vines and/or soft fruit, with a basic film of plastic.

Elongated sheets of the aforementioned type are known from practical experience and are particularly applied to a support post, a frame and/or a rope (or tensioning rope) which may be fastened to the support post.

The elongated sheet can design a gabled roof for the cultivated plants underneath. In principle, it is also known that the elongated sheet can be used in greenhouses. In particular, the sheet protects the cultivated plants from rain and/or the weather.

However, it has been found in practice that the cover of the cultivated plants causes especially hot and/or humid air to accumulate underneath the cover film, i.e. in the covered area. This air should preferably be able to escape from the covered area for optimum growth of the cultivated plants. At the same time, a supply of fresh air to ventilate the covered area is useful, especially to air, preferably of lower temperature as well as lower saturation, to facilitate the growth of cultivated plants.

In order to solve the above-mentioned problem, it is especially known in the state of the art to construct a ventilation area at the sheet, which can be adapted to ventilate and/or exhaust the covered area. The ventilation area can thereby comprise a plurality of ventilation openings which can ensure the exchange of air.

To prevent rain from penetrating through the ventilation openings into the cultivated plants and/or the covered area, it is also known to cover the ventilation openings. However, the disadvantage available with the cover of the ventilation openings known from the state of the art is that the guaranteed air exchange is not sufficient, which in turn is harmful to the cultivated plants and especially their growth.

The object of the present invention is to remedy the afore-mentioned problem.

According to the invention, the above-mentioned object is at least essentially solved by an elongated sheet for covering cultivated plants, which comprises a basic film of plastic, wherein a ventilation area extending in the central area of the basic film in the longitudinal sheet direction is provided with a plurality of ventilation openings. A cover film of plastic extending in the longitudinal sheet direction of the basic film is applied to the ventilation area, forming free spaces for air exchange, and is firmly welded to the basic film over a plurality of connection areas which follow one another in the longitudinal sheet direction. The connection area is designed to be inclined and/or oblique with respect to a weld start point and a weld end point in relation to the cross direction running orthogonally to the longitudinal sheet direction.

The ventilation openings of the ventilation areas serve especially for ventilation and/or exhaust of the covered area.

The inclination and/or oblique arrangement between the weld start point and the weld end point is to be understood in particular as meaning that the line connecting the weld start point with the weld end point, especially an "imaginary" line, is arranged inclined and/or angled and/or oblique with respect to the cross direction.

In particular, the free spaces are each provided above a ventilation section and/or the connection areas are designed in such a way that the free space tapers towards a longitudinal edge of the sheet, especially a longitudinal edge of the basic film.

Accordingly, such free space can be provided which comprises a narrowing shape due to the inclination of the connection area with respect to the cross direction. According to the invention, it has been found that this can ensure better ventilation and/or deaeration of the covered area. If the line connecting the weld start point with the weld end point had been arranged at least essentially in the cross direction of the sheet, a corrugated arrangement of the cover film on the basic film to form free spaces would have been possible, but these free spaces could not ensure a tapering of the covered area compared to an inclined connection area.

Preferably, the weld start point is the outermost point of the connection area facing a first longitudinal edge of the sheet, especially wherein the weld end point is the outermost end point of the connection area facing the further longitudinal edge of the basic film opposite the first longitudinal edge. Between the weld start point and the weld end point there is thus a displacement in cross direction. This especially allows that when a transverse force and/or a force directed in cross direction is applied to the sheet, the geometry of the connection area allows the elongation to be applied at lower levels near the weld end point and at higher levels near the weld start point. This results in the free space and/or cover film in the area between neighbouring connection areas being widened so that air can escape more easily. The further the sheet is stretched, especially along the cross direction, the larger the opening or free space becomes.

The connection area can be designed especially symmetrically, preferably mirror-symmetrically, or not symmetrically in relation to the cross direction. In principle, the connection area can be composed of two or more components. The connection area can also comprise continuous, punctual or interrupted individual welding sections.

In a further preferred embodiment, it is intended that the line connecting the weld start point with the weld end point, especially an imaginary line, encloses an angle of at least 5° to the cross direction. Preferably, the aforementioned angle is between 5° and 70°, even more preferably between 300 and 50°. In this context it is understood that the line connecting the weld start point with the weld end point does not have to be designed as a weld line or section—but it can be.

Ultimately, according to the invention, it is intended that the weld start point is a weld point and/or lies on a weld line. The weld end point is also a weld point and lies on the same weld line as the weld start point, on a further weld line and/or a further weld section. The weld line of the weld start point does not have to be directly connected to the further welding line of the weld end point.

In tests carried out according to the invention, it has been found that an angle of the above-mentioned magnitude allows such free space, which ensures optimum air circulation and especially leads to improved ventilation of the covered area. In this way, the hot and/or humid air of the covered area can escape via the free space, the geometry of which has been increased and improved by the above-mentioned angle arrangements.

In addition, it is understood that further welding points or sections may be provided between which the above-mentioned ratios of the weld start point and the weld end point do not apply.

According to the invention, it is intended that at least one weld start point and at least one weld end point are provided which can ensure the previously explained inclination.

Preferably, at least one connection area comprises at least one welding which is inclined with respect to the cross direction running orthogonally to the longitudinal direction—i.e. inclined with respect to the cross direction—and preferably continuous. The above-mentioned oblique welding limits the free space and allows the weld start point and weld end point to be arranged at an angle.

Especially the weld start point and the weld end point are provided at a common welding. Thus, both the weld start point and the weld end point can be arranged on the sloping welding, which is preferably designed to be continuous.

In this context, it is understood that the connection area can also include further welds/weldings, which especially do not run diagonally to the cross direction and/or on which neither the weld start point nor the weld end point is arranged.

Alternatively, it may be provided that the weld start point is arranged on a first welding line and the weld end point on a further welding line which is spaced from and/or shifted from the first welding line. Consequently, the weld start point and the weld end point can be arranged on different welding lines, which preferably do not merge into each other. Especially both the first and the further welding line can run at least essentially in cross direction.

In further embodiments, it may also be provided that the first and/or the second welding line is arranged at an angle to the cross direction or includes an angle of at least 5° to the cross direction.

In addition, the cover film can extend continuously in the longitudinal sheet direction and/or over the entire length of the basic film. The cover film is especially designed to completely cover the ventilation area. Especially preferably, the cover film can overlap the ventilation area with its edge area, especially at least on one side (in relation to the longitudinal edge of the basic film), even more preferably on both sides.

Alternatively, it may also be provided that the cover film comprises individual sections which preferably adjoin one another afterwards and/or are arranged to overlap one another. The individual sections of the cover film are especially designed at least essentially to cover the ventilation area. Especially the ventilation openings are covered and/or obscured by the cover film.

Preferably, the ventilation area comprises a plurality of neighbouring ventilation sections arranged one behind the other in the longitudinal sheet direction. Especially one ventilation section comprises at least one ventilation opening. Preferably all ventilation openings are arranged in ventilation sections, preferably grouped together. In this way the ventilation sections can each represent a grouped arrangement of ventilation openings. The ventilation sections can be provided over the entire longitudinal sheet direction and can be covered especially by the cover film.

Especially in each case and/or at least one connection area is arranged between adjacent and/or directly adjacent ventilation sections. In this way the ventilation sections can be separated via the connection areas. Preferably all connection areas are arranged between the ventilation sections and comprise the weld start point and weld end point according to the invention. In this way, especially an at least substantially symmetrical and/or uniform design can be achieved for the ventilation area, preferably a design with repetitions being arranged parallel to each other and/or arranged one behind the other in the longitudinal sheet direction.

Furthermore, the line connecting the weld start point with the weld end point, especially an imaginary line, can be designed to be inclined towards the immediately neighbouring ventilation section. Thus, for example, a connection area between two ventilation sections may comprise two lines which each connect the respective weld start point with the respective weld end point. The respective imaginary lines can be inclined towards immediately neighbouring ventilation sections. This allows the free space to be designed in an optimised way.

In particular in the area of a ventilation section, the length of the basic film running in the longitudinal sheet direction of the plastic film is smaller than the length of the cover film running in the longitudinal sheet direction, so that a free space is enclosed between the basic film and the cover film in the area of a ventilation section. This free space is limited by a connection area, especially in the longitudinal sheet direction. Preferably, the cover film in the area of a ventilation section can be designed at least 20% longer than the length of the covered area of the basic film. Even more preferably, for example, the length of the covered area of the basic film can be between 5 cm and 30 cm, preferably between 10 cm and 20 cm. Especially the length of the covered area of the basic film can be approx. 10 cm+/−30% and the length of the cover film approx. 15 cm+/−300%.

In addition, the ventilation area can comprise two ventilation segments, preferably mirror-symmetrical to each other, which are opposite each other at least in some areas. The ventilation segments can be designed especially in longitudinal direction. Preferably, the basic film can comprise at least two longitudinal segments on which the respective ventilation segments can be arranged. The ventilation segments of the longitudinal segments can thereby be arranged in the central area of the basic film and especially facing each other.

This is particularly advantageous if the sheet is used as a gable roof, for example. In the case of a gable roof, it may be provided that the separating line separating the ventilation segments and/or the longitudinal segments of the basic film, which preferably forms the centre line of the sheet, is placed on a tension cable, frame and/or at least one support post. As a result, the ventilation of the covered area can be ensured in the area of the ridge of the gable roof and/or over the central area of the sheet. In this area, especially the hot and/or humid air of the covered area of the cultivated plants accumulates, which can escape via the ventilation openings. A fresh air supply can be provided at the same time.

With the mirror-symmetrical design of the ventilation segments, especially the mirror axis can be designed by the longitudinal axis of the sheet and/or by the separating line. Alternatively or additionally, the mirror axis can also be the axis defined by the support on a tension cable and/or support means, such as a bar of a frame.

It is particularly advantageous if a ventilation section is framed by at least two connecting sections and/or weldings. Especially, a ventilation section can be enclosed by two (oblique) weldings. Preferably, the sloping design of a connection area can be provided, especially on both sides of the ventilation sections.

In case of a further particularly preferred embodiment of the inventive idea, it is intended that the welding and/or the first and/or further welding line extends over at least 10%, preferably between 20% to 90%, even more preferably between 30% and 80%, of the width of a ventilation section and/or the width of the ventilation area and/or the width of the ventilation segments. The width of the ventilation section, ventilation area and/or ventilation segments extends especially in cross direction.

Alternatively or additionally, it may be provided that the welding and/or the first and/or further welding line comprises a length of at least 10%, preferably between 20% to 90%, even more preferably between 30% to 80%, of the width of a ventilation section and/or the width of the ventilation area and/or the width of the ventilation segments. With the above-mentioned size arrangements of the welding lines and/or the welding, a safe limitation of the free space can be ensured, which is determined by the connection area, especially with regard to its shape.

In particular, the connection area may extend at least substantially over the width of the ventilation section and/or the width of the ventilation area and/or the width of the ventilation segment, but may comprise segments that are free of welded joints so that, in particular, channels for air exchange can be formed.

In another particularly more preferably design form, at least one, preferably all (oblique) welding(s) and/or the first and/or further welding line is designed straight or curved at least in sections. Preferably, at least one, especially all (oblique) welding(s) and/or the first and/or the further welding line is designed completely straight or curved. In the case of a curved design, a sectional curved design is particularly preferably chosen. The above-mentioned welding forms are easy to realise in terms of production technology and can provide a defined straight or curved limitation of the free space.

Alternatively or additionally, it can be provided that at least one, preferably all, (oblique) welding(s) is/are designed uninterrupted and/or continuous or interrupted.

Furthermore, in the case of an even more preferred design, it is provided that immediately neighbouring weldings, especially those running at an angle to the cross direction, design a V-shape, at least in some areas. In the case of a V-shaped design, it may be provided that the immediately neighbouring weldings merge into one another to form a corner, especially an acute corner. Alternatively, it can be provided that a spacing is provided between the neighbouring weldings so that especially the at least substantially pointed corner and/or the apex of the V is not designed.

In principle, a further preferred embodiment can also provide that the entire connection area, preferably completely, is designed in a Y-shape at least in some areas. In addition to the components of the Y-shape, further welding sections can also be provided in the connection area. Alternatively, according to the invention, it is especially intended that a connection area between two ventilation sections should design the Y-shape at least in some areas and should not include any further welding that is not part of the Y-shape.

The Y-shape is preferably designed to be uninterrupted, continuous or interrupted. In this way, the V-shaped design of neighbouring welds can also be integrated into the Y-shape.

Both in the Y-shape and the V-shape it can be provided that the neighbouring legs are designed straight or curved, so that especially at least essentially a Y-shaped and/or a V-shaped formation is achieved.

The V-shape is in particular characterised by two legs arranged at an at least substantially acute angle to each other, which can be designed straight or curved. In the case of the Y-shape, especially additional to the V-shape, an at least substantially straight section is provided afterwards.

Preferably, at least one connection area comprises at least one further welding extending at least substantially in cross direction, in particular wherein a further welding is arranged between two neighbouring ventilation sections and/or in particular wherein the further welding is/are at least substantially straight, and/or in particular wherein a Y-shaped formation of the connection area is provided at least in regions by the further welding.

Alternatively, the further welding can also be inclined—with respect to the cross direction—and/or curved.

When designing the sheet with two ventilation segments, it is particularly preferred that the weldings are arranged adjacent to the respective upper area of the ventilation section facing the separating line. Consequently, especially the V-shaped area of the connection area can be arranged in the upper area facing the separating line. Especially, the further welding can be arranged in the lower area facing away from the separating line. Preferably, the further welding can be adjacent to the nearest longitudinal edge of the cover film. The (oblique) welding, especially the V-shaped design of the connection area, can especially be arranged in the part facing away from the nearest longitudinal edge of the cover film. Accordingly, the tapering design of the free space can be designed especially to face the separating line, the tapering thus points towards the separating line.

In another even more preferably design, the connection area comprises at least one intermediate ventilation channel. The intermediate ventilation channel can be used especially for air exchange between two directly neighbouring ventilation sections. To design the intermediate ventilation channel, it can be provided that the further welding is spaced from at least one (oblique) welding, preferably from both (oblique) weldings. Alternatively or additionally, it can be provided that the first and second welding lines are spaced apart and/or that further welding is designed to be interrupted. By interrupting the connection area—with regard to the welding sections—an intermediate ventilation channel can finally be provided.

In addition, in the case of a further preferred embodiment, it is provided that the further welding extends over at least 5%, preferably between 8% and 60%, even more preferably between 10% and 50%, of the width of a ventilation section and/or width of a ventilation area and/or width of the ventilation segment. Alternatively or additionally, it may be provided that the further welding comprises a length of at least 5%, preferably between 8% and 60%, even more preferably between 10% and 50%, of the width of a ventilation section and/or width of the ventilation area and/or width of the ventilation segment. The length of the further welding can especially extend in cross direction and/or at least essentially in cross direction. The width of the ventilation section, ventilation area and/or ventilation segments also refers especially to the width of the respective area in the cross direction.

Furthermore, it is more preferably that the width—i.e. the width extending in the cross direction—of the cover film is smaller than the width of the basic film. This means that the basic film can comprise areas that are not covered by the cover film. The cover film is especially used to cover the central area of the basic film. It is preferable that the cover film overlaps the ventilation area, the ventilation segments and/or the ventilation section on at least one side, preferably on both sides, by a maximum of 15 cm, preferably a maximum of 10 cm, even more preferably a maximum of 5 cm. Especially, the width of the cover film may correspond to the width of the basic film by a maximum of 70%, preferably between 5% and 50%, even more preferably between 10% and 30%.

Preferably, the cover film rests on the basic film in the area of a connection area, at least in some areas. Especially between two immediately adjacent weldings and/or between immediately adjacent first welding lines and/or between two immediately adjacent further welding lines it may be provided that the cover film lies on the basic film at least in areas, preferably over the entire surface. In particular in these areas, the cover film lies at least substantially tightly against the basic film. This makes it possible for the cover film available in the ventilation section to comprise a greater length (in relation to the longitudinal sheet direction), as no free space, which would be formed by the cover film, is required, especially in the connection area. This means that the cover film can rest on the basic film in these areas, and in the areas of the ventilation sections it can enclose a space from the basic film to design a free space.

In particular between the opposing ventilation segments and/or the opposing ventilation sections and/or between the opposing weldings of the respective ventilation section, a central transition area covered by the cover film can be provided. The transition area may preferably be designed free of welding and/or welding sections and/or comprise no ventilation openings. The transition area can especially include the separating line and is preferably used to rest on a (tensioning) rope, a frame and/or at least one supporting post. The transition area makes it possible that a continuous cover film can be used both to cover one ventilation segment and to cover the other ventilation segment, wherein the ventilation segments can be connected to each other via the transition area. Thereby an air exchange over the transition area can be guaranteed. However, such an air exchange is not necessary, especially due to the ventilation openings.

Preferably, at least one ventilation section, especially all ventilation sections, comprises a plurality of ventilation openings, preferably at least substantially identical. Especially between two and thirty, preferably between three and ten, ventilation openings can be provided in a ventilation section. The ventilation openings are preferably arranged in rows. The rows can also preferably run at least essentially parallel to the longitudinal sheet direction. A grouped arrangement of the ventilation openings can thus be provided in a ventilation section.

The number of ventilation openings in a row may differ in a ventilation section and may especially decrease towards the separating line. For example, four ventilation openings may be provided in the "bottom" and/or outermost row (i.e. the row facing the nearest longitudinal edge of the cover film), wherein three ventilation openings may be provided in a second row above the bottom row. In the uppermost row facing the separating line, for example, two ventilation openings may be arranged. In particular the number of ventilation openings of two immediately neighbouring rows may differ by at least 1, preferably at least 2, even more preferably between 2 and 4.

As explained above, it is particularly preferred when the area of the ventilation section belonging to the basic film and/or the area it occupies between neighbouring connection areas, preferably on both sides, tapers towards the separating line. A taper of the separating line requires, in particular, that the volume of the free space for air exchange can be improved when a lateral force is applied.

Furthermore, the ventilation openings can be designed as breakthroughs in the basic film, so that especially a simple provision of the ventilation opening can be guaranteed. The basic film may comprise fastening means at its longitudinal edges. Especially the fastening means can be formed by an opening on the basic film and by hooks or the like that can be inserted into the opening. The fastening means can especially be used to fasten neighbouring sheets and/or to fasten the sheet with a support means, for example a cross brace. The fastening means, especially in combination with a tension belt, can also be designed to fasten to the floor and/or ground. The fastening means can ultimately be used to permanently tension the sheet.

Preferably, the basic film and/or the cover film is designed to be translucent and/or transparent at least in certain areas, preferably completely. Light transmission can be provided especially for a wavelength range of the incoming radiation between 400 nm and 700 nm. For other wavelength ranges, the basic and/or cover film may or may not be transparent. Light transmission particularly ensures that the cultivated plants located under the sheet can be adequately supplied with daylight.

Preferably, the cover film and/or the basic film comprises and/or consists of a thermoplastic synthetic material. The thermoplastic material may be a polyolefinic material.

Especially polyethylene (PE), soft polyethylene (LDPE), linear low density polyethylene (LLDPE), ethylene butyl acrylate copolymer (EBA), ethylene vinyl acetate (EVA) and/or mixtures thereof can be used as material. The above-mentioned materials in particular allow a stable, preferably stretchable and transparent design of the respective film.

The basic film can comprise a width between 0.5 m and 40 m, preferably between 1 m and 20 m, even more preferably between 1.5 m and 15 m. Alternatively or additionally, it can be provided that the cover film comprises a width of at least 10 cm, preferably between 10 cm and 2 m, more preferably between 0.4 m and 1 m.

In addition, the sheet can in particular comprise a length of at least 1 m, preferably between 2 to 1000 m, even more preferably between 10 m and 800 m. The sheet can be supplied in the length required by the customer. Especially the sheet can be provided rolled up so that the customer can unroll it, especially for placing on a support rope. As a result, the sheet can be transported relatively easily.

Alternatively or additionally, the sheet can be folded in a zig-zag-form and can be stacked on pallets.

Furthermore, the basic film and/or the cover film can be designed to be breathable. Micro-perforations in the basic film and/or the cover film can especially be used to design the sheet to be breathable.

A microporous design is particularly preferred for the cover film. The breathable design allows warm air to escape from the covered area even more easily.

Furthermore, additives can also be added to the material of the cover film and/or the basic film, especially to improve the material properties. Additives can especially be soot particles, silica, tungsten and/or manganese particles and/or nanoparticles of soot particles, silica, tungsten and/or manganese particles. The aforementioned additives can especially absorb heat.

Heat-absorbing additives are particularly preferred for cover film. The additives can in particular cause a temperature difference which allows a draught to develop. This can especially improve the flow of hot air and its exchange with fresh air. For example, the addition of heat-absorbing additives can improve air circulation, which may be related to improved care of cultivated plants.

Furthermore, the present invention relates to the use of a sheet according to one of the above-mentioned designs in the agricultural sector. The sheet is preferably used for the cover of cultivated plants, preferably soft fruits. The cultivated plants can especially thus be protected from rain and/or weather influences. Alternatively or additionally, the sheet can be used for aeration and ventilation of the covered area. It is advantageous that the sheet can be used for air exchange, especially to allow warm and/or humid air to escape from the covered area.

In particular, the sheet can be used in greenhouses, preferably as external cover.

In this context, it is understood that reference may also be made to the previous remarks with regard to advantages and/or preferred embodiments, which apply in the same way to the use according to the invention.

In the following, a further inventive embodiment is presented, which can especially be realised independently of the invention described earlier and which constitutes a contribution according to the invention itself. It goes without saying that the features and/or properties as well as advantages described earlier are transferable to the subsequent embodiment without the need for further explicit mention. Furthermore, according to the invention, it is intended that the features, properties, advantages and/or preferred embodiments described below also apply to the embodiments described earlier, especially without the need for further explicit mention.

According to the invention, especially at least substantially in the case of an elongated sheet for covering agricultural cultivated plants with a basic film of plastic, a ventilation area extending in the longitudinal sheet direction with a plurality of ventilation openings is provided in the central area of the basic film and at least one ventilation opening comprises two opposite corners at least substantially in the cross direction of the sheet extending orthogonally to the longitudinal sheet direction. A plurality of ventilation openings is provided and especially all of them are preferably designed in this way.

The ventilation openings of the ventilation areas serve in particular for aeration and/or deaeration of the covered area and allow in particular hot and/or humid air to escape from the covered area.

The corners of a ventilation opening which are opposite each other in cross direction facilitate especially the application of the film to a tensioning rope or a frame, especially to a bar of a frame. This leads to a significant reduction in the effort required for the application or laying of the sheet and also to a drastic saving of time. This enables the saving of costs during laying.

Preferably, the special shape—according to the invention—of the ventilation opening, which comprises at least two opposite corners, can prevent the ventilation opening from folding and/or jamming of the ventilation opening on the rope and/or bar when the sheet is pulled over the tension rope and/or bar. Especially there will be no tearing of ventilation openings and/or damage to the sheet.

In principle, according to the invention, different designs and/or embodiments of the ventilation opening are conceivable.

Furthermore, the sheet may comprise ventilation openings of different shapes, especially wherein at least 60%, preferably at least 80%, of the ventilation openings are designed according to the invention.

It is more preferably that the ventilation opening is designed and arranged on the basic film in such a way that the opposing corners form the outermost corners and/or the outermost edges and/or the outermost boundary and/or edge of the ventilation opening to the respective immediately neighbouring longitudinal edge of the basic film. This particularly ensures that, if the sheet is pulled over a tensioning rope and/or bar, the corner of the ventilation opening oriented in the cross direction first meets the tensioning rope and/or bar.

It is preferred that the opposite corners are arranged on and/or in the basic film in such a way that the line connecting the opposite corners runs at least substantially in the cross direction. Alternatively or additionally, it can be provided that the line connecting the opposite corners is arranged inclined to the cross direction and/or includes a first angle to the cross direction of maximum+/−20°, even more preferably maximum+/−10°.

The (at least two) opposite corners are especially needed to be able to wind up the sheet from both sides.

Preferably, the invention stipulates that no further corner and/or no section or area of the ventilation opening protrudes over and/or is aligned with the corner according to the invention in such a way in relation to the cross direction that especially this further corner and/or this section or this area is closer to or at the same height as the nearest and/or immediately neighbouring longitudinal edge of the basic film. This also helps to avoid problems during application.

In the case of a particularly preferred embodiment, it is intended that at least one of the opposite corners, preferably both opposite corners according to the invention in the direction of their apex, are designed to be pointed or rounded.

A rounded corner is preferably a rounded corner, which is especially designed at least in some areas in the shape of a section of an arc with a small or very small radius. Especially the corners have an inner angle of less than 180°.

A plastic cover film running in the longitudinal sheet direction of the basic film is especially applied to the ventilation area, forming free spaces for air exchange and firmly welded to the basic film over a number of connection areas which follow one another in the longitudinal sheet direction. The cover film can especially protect the covered area from rain and/or weather influences. Preferably, the cover of the ventilation area can ensure that at least essentially no rain can penetrate through the ventilation opening into the covered area. Thus, damage to cultivated plants can be avoided.

Preferably, the ventilation opening have a design that is at least essentially elongated in cross direction. An elongated design means in particular that the length of the ventilation opening in cross direction is especially larger than the width in longitudinal sheet direction. The aforementioned design ensures good ventilation and easy laying of the sheet. Tests have shown that non-elongated designs are more likely to cause the ventilation opening to fold in or even tear open when the sheet is laid and/or pulled over a rope or bar. The risk of such a problem can thus be further reduced by elongated training designed according to the invention.

In addition, tests have shown that the ventilation opening is preferably designed in a rhombus shape. Thus, an at least essentially rhombus-shaped design allows the sheet to be pulled comparatively easily in the cross direction over a bar and/or rope without edge areas of the ventilation opening "getting caught" on the rope or the like. The rhombus shape can ensure that the ventilation opening neither gets jammed nor folds in.

However, in addition to the rhombus-shaped design, other designs are particularly advantageous and can be provided especially as a function of different applications. For example, a polygon-shaped, especially pentagonal or hexagonal, ventilation opening is most preferably designed. Furthermore, the ventilation opening can also be designed as a triangle, preferably as an irregular, obtuse triangle and/or as an isosceles, obtuse triangle and/or as an equilateral triangle.

In addition, the ventilation opening may comprise at least sections of at least substantially straight or curved outer borders. In addition, the ventilation opening may have, at least in sections, at least substantially semicircular and/or elliptical outer edges.

In the case of a further embodiment, it is particularly preferably provided that, in relation to a line connecting the opposite corners, especially an imaginary line connecting the opposite corners, starting from the centre point of the ventilation opening at an angle of at least +/−20°, preferably at least +/−45°, even more preferably +/−80°, only the outermost opposite corners according to the invention are provided and no further corners of the ventilation opening are provided. The above-mentioned geometric design also at least in particular reliably prevents the ventilation opening from being folded or torn open.

In addition, a further preferred design is that the ventilation opening comprises a maximum length of at least 1 mm, preferably between 2 mm and 200 mm, even more preferably between 4 mm and 80 mm. Alternatively or additionally, it may be provided that the ventilation opening comprises a maximum width (in particular running in longitudinal sheet direction) of at least 0.5 mm, preferably between 1 mm to 100 mm, even more preferably between 2 mm to 40 mm. Particularly preferably, the length of the ventilation opening running in the cross direction exceeds the width by at least 30%, preferably between 40% and 200%, even more preferably between 50% and 150%.

The ventilation opening may particularly comprise an area of at least 0.1 cm$^2$, preferably between 0.1 cm$^2$ and 5 cm$^2$, even more preferably between 1 cm$^2$ and 3 cm$^2$.

Furthermore, the corner, which is especially designed as an inner corner and/or as a pointed corner, may include an angle of at least 10°, preferably between 20° and 100°, even more preferably between 30° and 90°. In tests carried out during the development of the invention, it has been found that with the above-mentioned dimensions of the angle, simple assembly and/or simple laying of the sheet is possible.

In addition, according to the invention, the above object can be solved at least essentially by providing an elongated sheet for covering cultivated plants with a basic film of plastic, especially according to one of the preceding designs. Thereby a ventilation area extending in the central area of the basic film in the longitudinal sheet direction with a plurality of ventilation openings is provided. A plastic cover film extending in the longitudinal direction of the basic film is applied to the ventilation area, forming free spaces for air exchange and firmly welded to the basic film over a plurality of connection areas which follow one another in the longitudinal sheet direction. According to the invention, it is intended that the sum of the areas of all ventilation openings corresponds to at least 1%, preferably between 1.1% and 3%, even more preferably between 1.3% and 2%, of the total area of the basic film.

By the above-mentioned size ratio between the area of all ventilation openings taken up and the total area of the basic film an improved ventilation and/or deaeration via the ventilation area can be ensured. Tests have shown that especially at least 1% of the total area of the basic film ensures a very good to ideal ventilation. In practice, this area is considerably smaller and especially amounts to a maximum of 0.5%.

In the tests carried out it has been further established that, even independently of the design of the ventilation opening and/or the oblique welding, the above-mentioned ratios between the area of a ventilation opening and the total area of the basic film allow for an improved use of the sheet and a better harvest result.

In this context, it is understood that reference may also be made to the previous remarks, which apply in the same way, with regard to advantages and/or preferred embodiments.

Further features, advantages and possible applications of the present invention result from the following description of embodiment examples based on the drawing and the drawing itself. Thereby all described and/or pictorially depicted features, either on their own or in any combination, form the subject matter of the present invention, irrespective of their summary in the aspects and their retrospective relationship.

It shows:

FIG. 1 a schematic top view of a part of a sheet according to the invention, FIG. 2 a schematic top view of an area of a further embodiment of a sheet according to the invention, FIG. 3 a schematic top view of an area of a further embodiment of a sheet according to the invention, FIG. 4 is a schematic top view of an area of a further embodiment of a sheet according to the invention, FIG. 5 a schematic top view of an area of a further embodiment of a sheet according to the invention, FIG. 6 a schematic sectional view of the sheet shown in FIG. 5 in the state of use along the cut A-A, FIG. 7 a schematic sectional view of the area of the sheet shown in FIG. 5 in the state of use along cut B-B, FIG. 8 a schematic sectional view of the area of the sheet shown in FIG. 5 in the state of use along cut C-C, FIG. 9 a schematic sectional view of the area of the sheet shown in FIG. 5 in the state of use along the cut D-D, FIG. 10 a schematic sectional view of the area of the sheet shown in FIG. 5 in the state of use along cut E-E, FIG. 11 a schematic illustration in perspective of a part of the sheet in the state of use, FIG. 12 a schematic top view of a part of a further embodiment of a sheet according to the invention, FIG. 13 a schematic illustration of a ventilation opening according to the invention, FIG. 14 a schematic illustration of a further embodiment of a ventilation opening according to the invention, FIG. 15 a schematic illustration of a further embodiment of a ventilation opening according to the invention, FIG. 16 a schematic illustration of a further embodiment of a ventilation opening according to the invention, FIG. 17 a schematic illustration of a further embodiment of a ventilation opening according to the invention, FIG. 18 a schematic illustration of a further embodiment of a ventilation opening according to the invention, FIG. 19 a schematic illustration of a further embodiment of a ventilation opening according to the invention, FIG. 20 a schematic illustration of a further embodiment of a ventilation opening according to the invention, FIG. 21 a schematic illustration of a further embodiment of a ventilation opening according to the invention, FIG. 22 a schematic illustration of a further embodiment of a ventilation opening according to the invention, FIG. 23 a schematic illustration of a further embodiment of a ventilation opening according to the invention, FIG. 24 a schematic illustration of a further embodiment of a ventilation opening in accordance with the invention, FIG. 25 a schematic illustration of a connection area according to the invention, FIG. 26 a schematic illustration of a further embodiment of a connection area according to the invention, FIG. 27 a schematic illustration of a further embodiment of a connection area according to the invention, FIG. 28 a schematic illustration of a further embodiment of a connection area according to the invention, FIG. 29 a schematic illustration of a further embodiment of a connection area according to the invention and FIG. 30 a schematic illustration in perspective of a further embodiment of a sheet according to the invention in the state of use.

FIG. 1 shows an elongated sheet 1 for covering cultivated plants 2. The covering of cultivated plants 2 by the sheet 1 is shown in a schematic illustration in FIG. 11.

The sheet 1 comprises a basic film 3 made of plastic. In the central area 4 of the basic film 3 there is a ventilation area 5 extending in the longitudinal sheet direction L with a plurality of ventilation openings 6.

The central area 4 of the basic film 3 is especially arranged at least essentially in the area of the centre line of the basic film 3. The centre line runs parallel to the longitudinal edges 7, 8 of the basic film 3.

It goes without saying that in other embodiments the central area 4 can also be at a distance from the centre line and/or is not designed to be mirror-symmetrical in relation to the centre line. In any case, the central area 4 is at a distance from both longitudinal edges 7, 8 of the basic film 3.

The distance to the respective longitudinal edges 7, 8 can be different. Especially the distances starting from the respective longitudinal edge of the central area 4 to the respective immediately neighbouring longitudinal edge 7, 8 differ in further embodiments by a maximum of 50%, preferably a maximum of 20%.

In addition, FIG. 4 shows that a plastic cover film 9 is provided on the ventilation area 5, running in the longitudinal sheet direction L of the basic film 3, and is firmly welded to the basic film 3 over a plurality of connection areas 10 consecutive in the longitudinal sheet direction L.

FIG. 1 does not show that the cover film 9 is connected to the basic film 3 by the connection areas 10 in such a way that free spaces 11 are formed. The free spaces 11 are shown schematically in FIG. 11. In addition, the free spaces 11 are shown in FIGS. 6, 8 and 10. FIGS. 6 to 10 are schematic sectional views of sheet 1 shown in FIG. 5 in its (actual) state of use. Sheet 1 is thereby used as a gable roof, as can be seen schematically in FIG. 11.

FIG. 6 shows cut A-A from FIG. 5, but in the state of use of the sheet 1 shown in FIG. 5. FIG. 7 shows the cut along line B-B.

FIG. 6 is a schematic illustration of free space 11. In FIG. 7 no free space 11 is available. This is finally due to the fact that the cut B-B runs through the connection areas 10.

Figure 5:
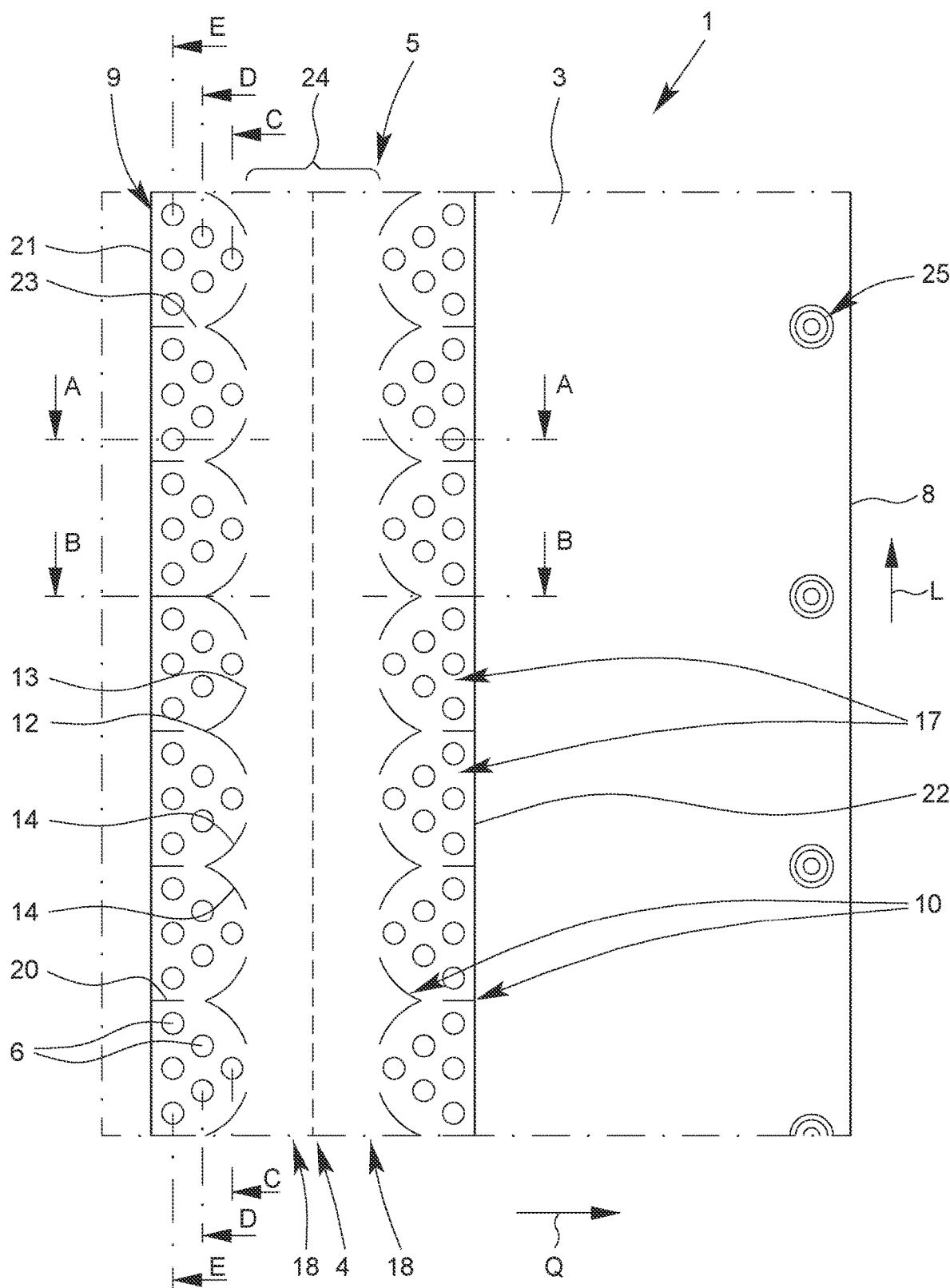
Figure 6:
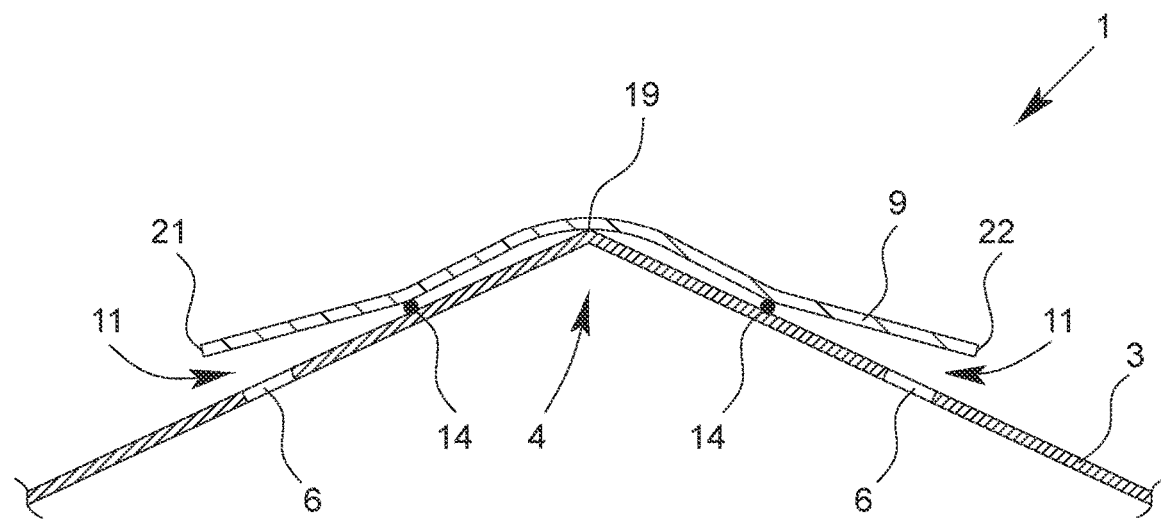
Figure 7:
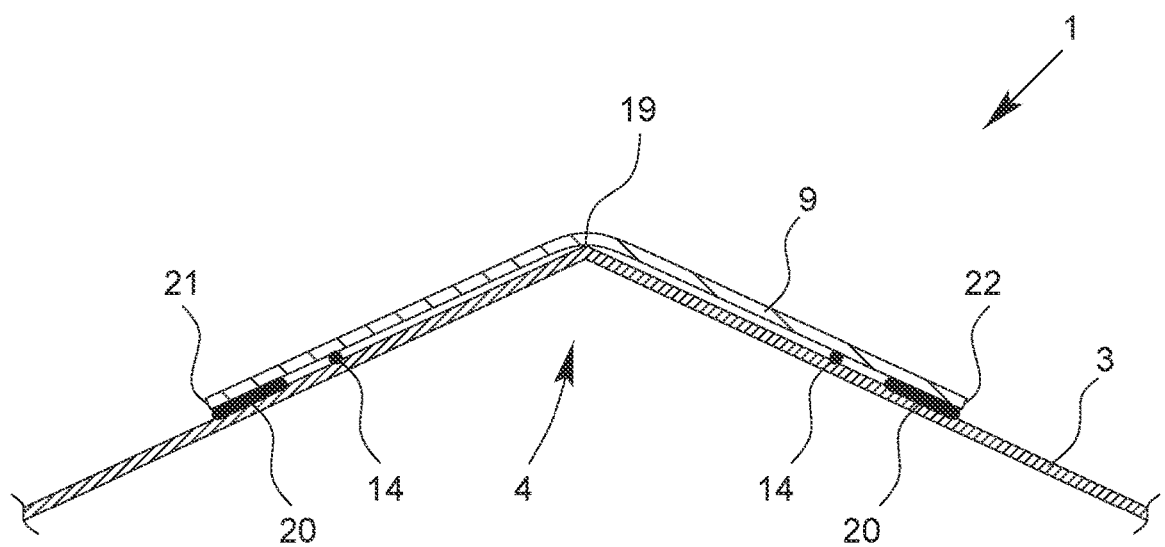
Figure 8:
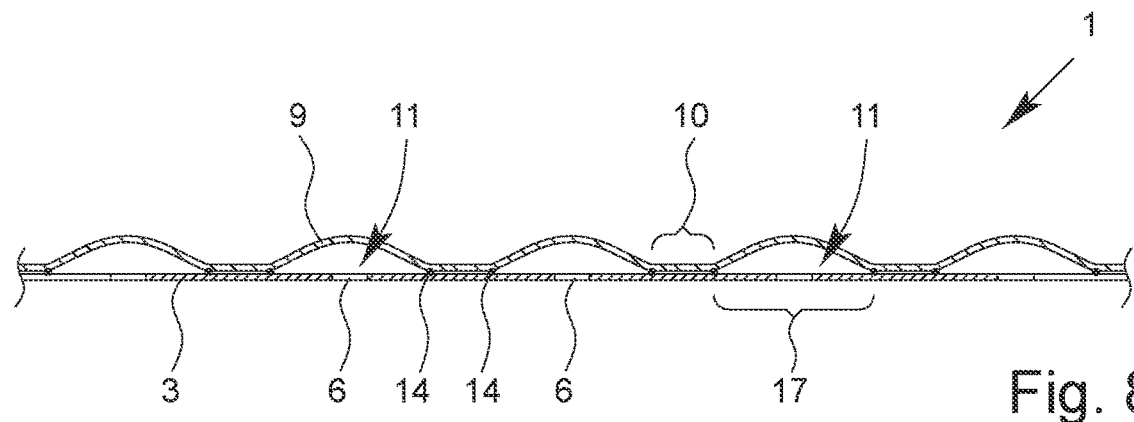
FIG. 8 shows the cut C-C from FIG. 5. The sheet 1 is shown in an elongated state, so that the free spaces 11 are shown schematically.
Figure 9:
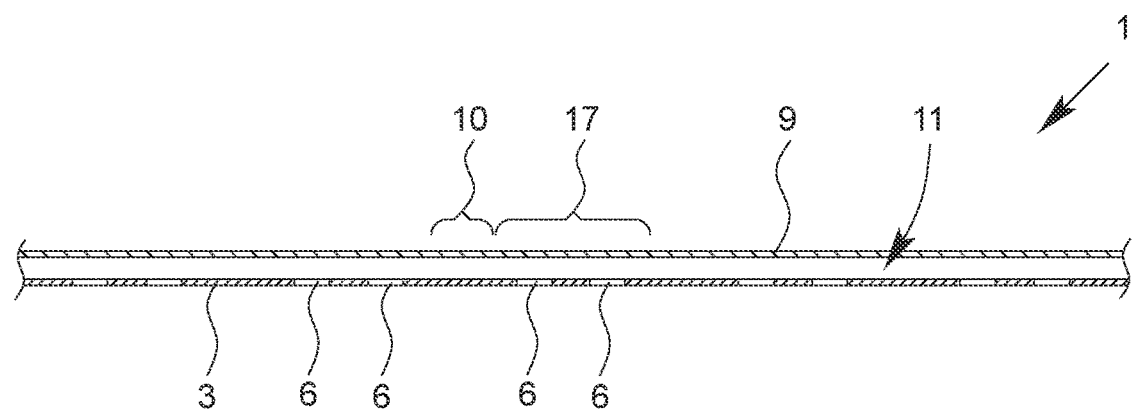
FIG. 9 shows the cut D-D from FIG. 5, wherein the free space 11 is at least essentially continuous.
Figure 10:
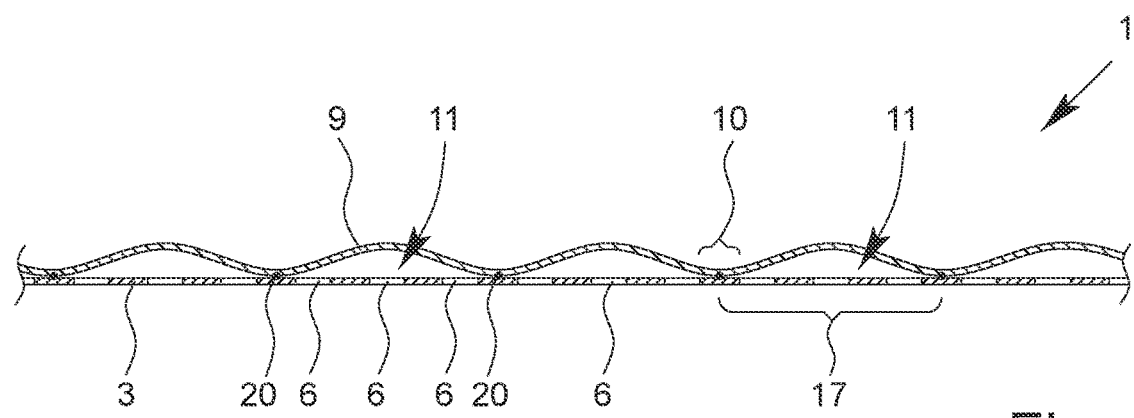

The sectional view in FIG. 10, which shows cut E-E from FIG. 5, also shows a large number of free spaces 11.

Figure 1:
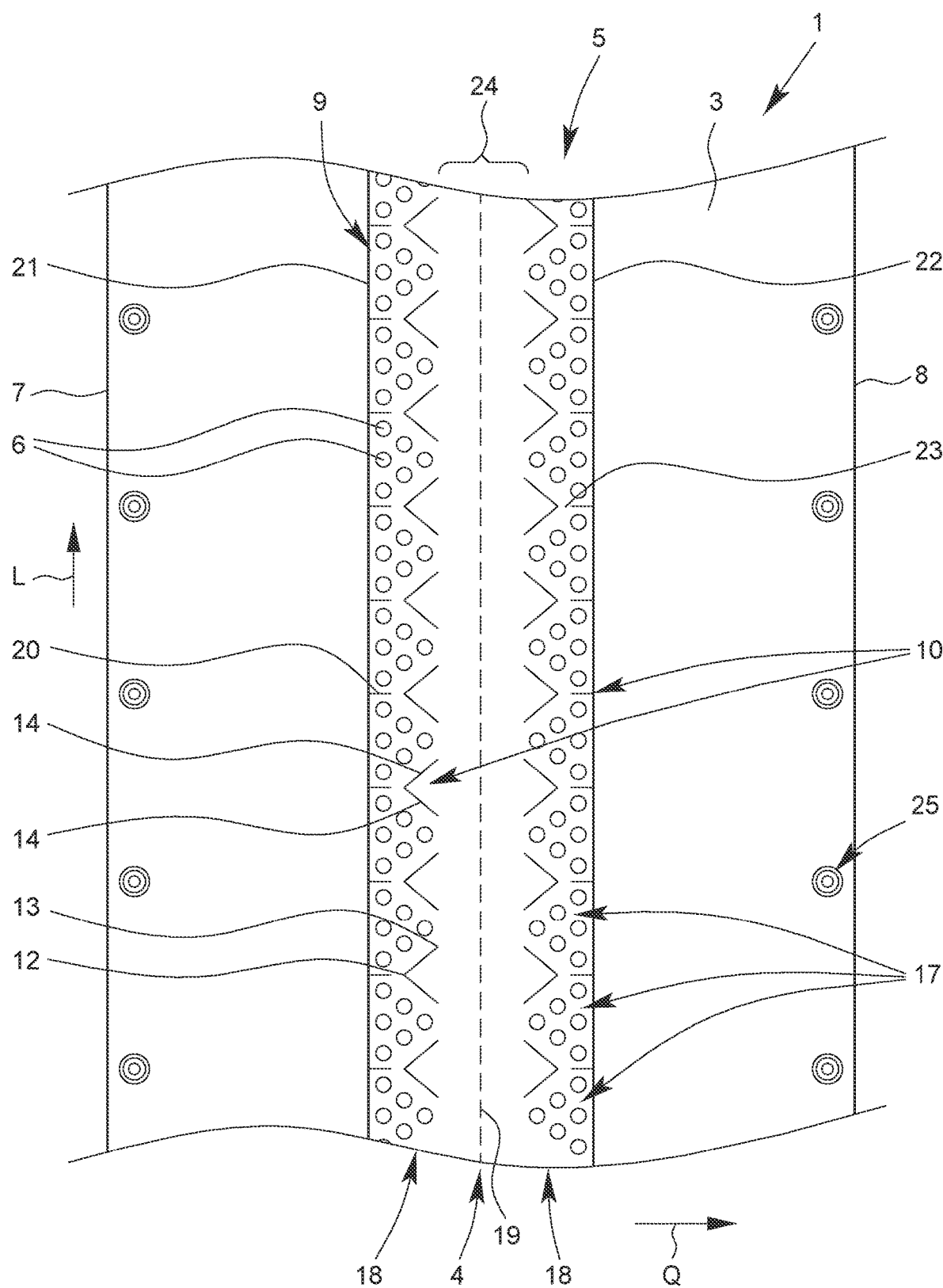

FIG. 1 shows that the connection area 10 is designed to be inclined at least in some areas with respect to a weld start point 12 and a weld end point 13 with respect to the cross direction Q running orthogonally to the longitudinal sheet direction L. The weld start point 12 and/or the weld end point 13 thereby adjoin the immediately neighbouring free space 11. Otherwise, weld points 12, 13 may represent the starting point or end point of a weld line and/or section—but need not.

An inclined design between weld start point 12 and weld end point 13 is to be understood as meaning that the line connecting the weld start point 12 with the weld end point 13, especially an imaginary line, is inclined and/or angled to the cross direction Q.

Figure 25:
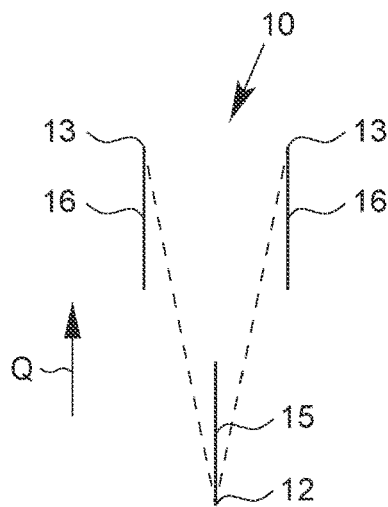
Figure 26:
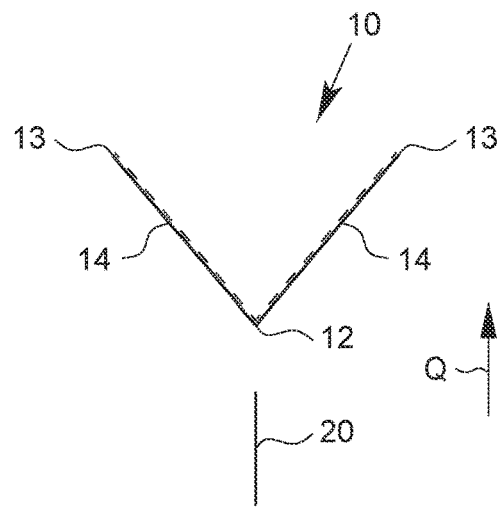
Figure 27:
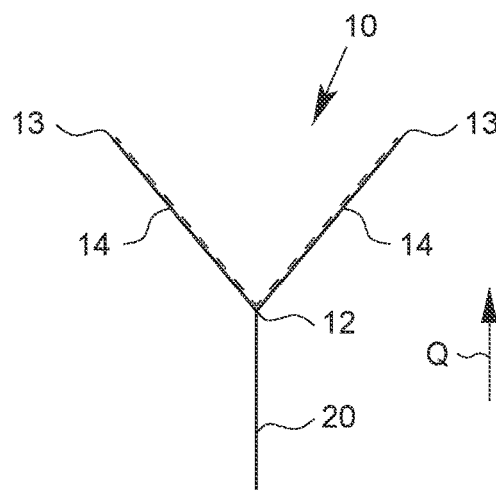
Figure 28:
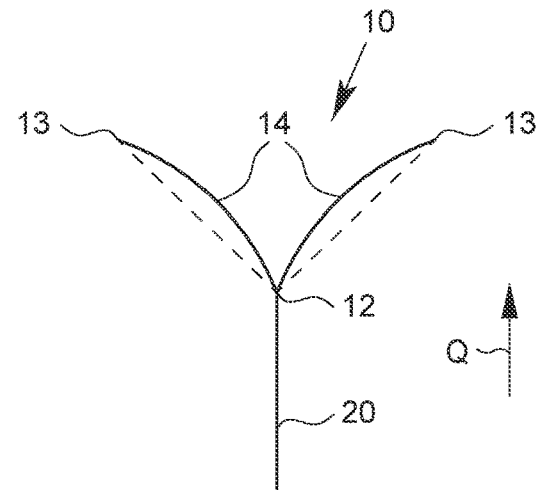
Figure 29:
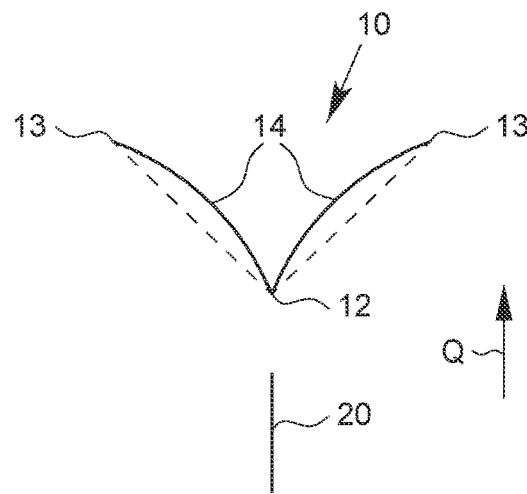

FIGS. 25 to 29 show differently shaped connection areas 10. The "imaginary" line connecting the weld start point 12 with the weld end point 13 is shown as a dashed line. It is also clear that different weld points can form the weld start point 12 and the weld end point 13. Welding points 12, 13 are preferably the outermost points of a weld line. FIG. 25 shows that weld start point 12 and weld end point 13 are located on different weld lines 15, 16.

In this connection it is understood that the connection area 10 may also include further weld spots or sections where the line connecting these weld spots or sections does not comprise an arrangement inclined to the cross direction Q.

Figure 2:
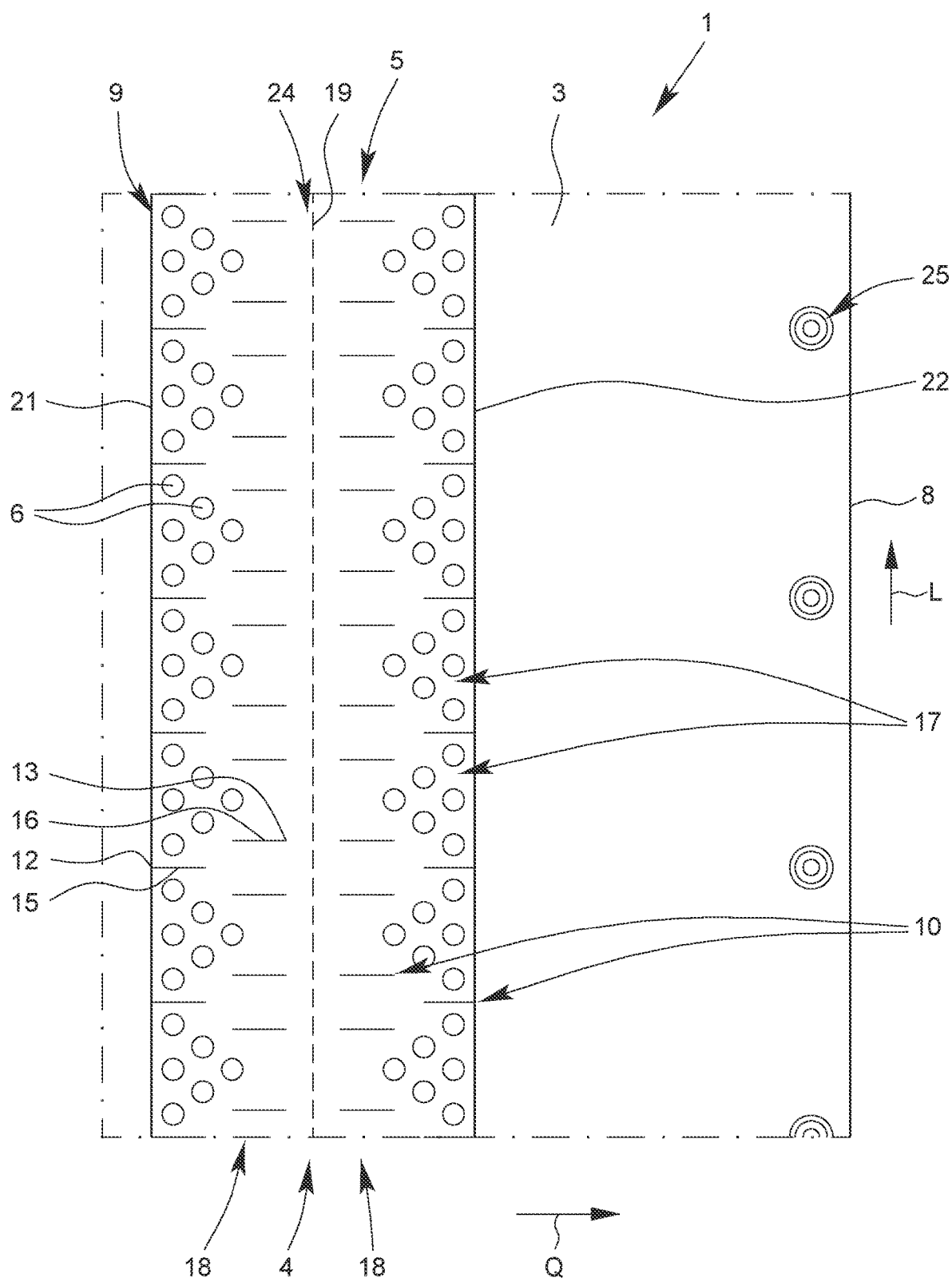

FIG. 2 shows that the weld start point 12 is the outermost weld point of the connection area 10 and faces the longitudinal edge 7. FIG. 2 further shows that the weld end point 13 is the outermost weld point of a connection area 10. However, this design does not necessarily have to be implemented.

The weld end point 13 is in any case further away from the longitudinal edge 7 than the weld start point 12.

Also, the weld start point 12 does not have to be the outermost weld point of a connection area 10, but it can be. The weld end point 13 can face the further longitudinal edge 8 of the basic film 3 opposite the longitudinal edge 7. Finally, the weld end point 13 is closer to the further longitudinal edge 8 than the weld start point 12.

The inclined arrangement between weld start point 12 and weld end point 13 can be used to ensure that the enclosed free space 11 tapers—especially towards separating line 19 of the sheet 1. In other words, this means that the free space 11 increases and/or widens towards the neighbouring longitudinal edge starting from separating line 19. A schematic illustration in perspective of the narrowing and/or expansion of the free space 11 can be seen especially in FIG. 11.

FIG. 1 shows that the line connecting the weld start point 12 with the weld end point 13 encloses an angle to the cross direction Q of at least 5°, preferably between 30° and 50°. In this context, it is understood that the above-mentioned angle may also depend on the fact which weld points of the connection area 10 are identified as weld start point 12 and weld end point 13.

For example, FIG. 2 shows that different weld points can be identified as weld start point 12 and weld end point 13. In the embodiment shown in FIG. 2, the outermost weld points of connection area 10 are finally weld start point 12 and weld end point 13. This is not necessarily the case, however. In particular, as a function of this, the above-mentioned angle depends on it, which is especially at least 5° in any case.

FIG. 1 shows that at least one connection area 10, especially all connection areas 10, comprises at least one welding 14 which is oblique, especially continuous, in relation to the cross direction Q running orthogonally to the longitudinal sheet direction L. In the illustrative embodiment shown in FIG. 1, at least two weldings 14 are provided for each connection area 10.

Figure 3:
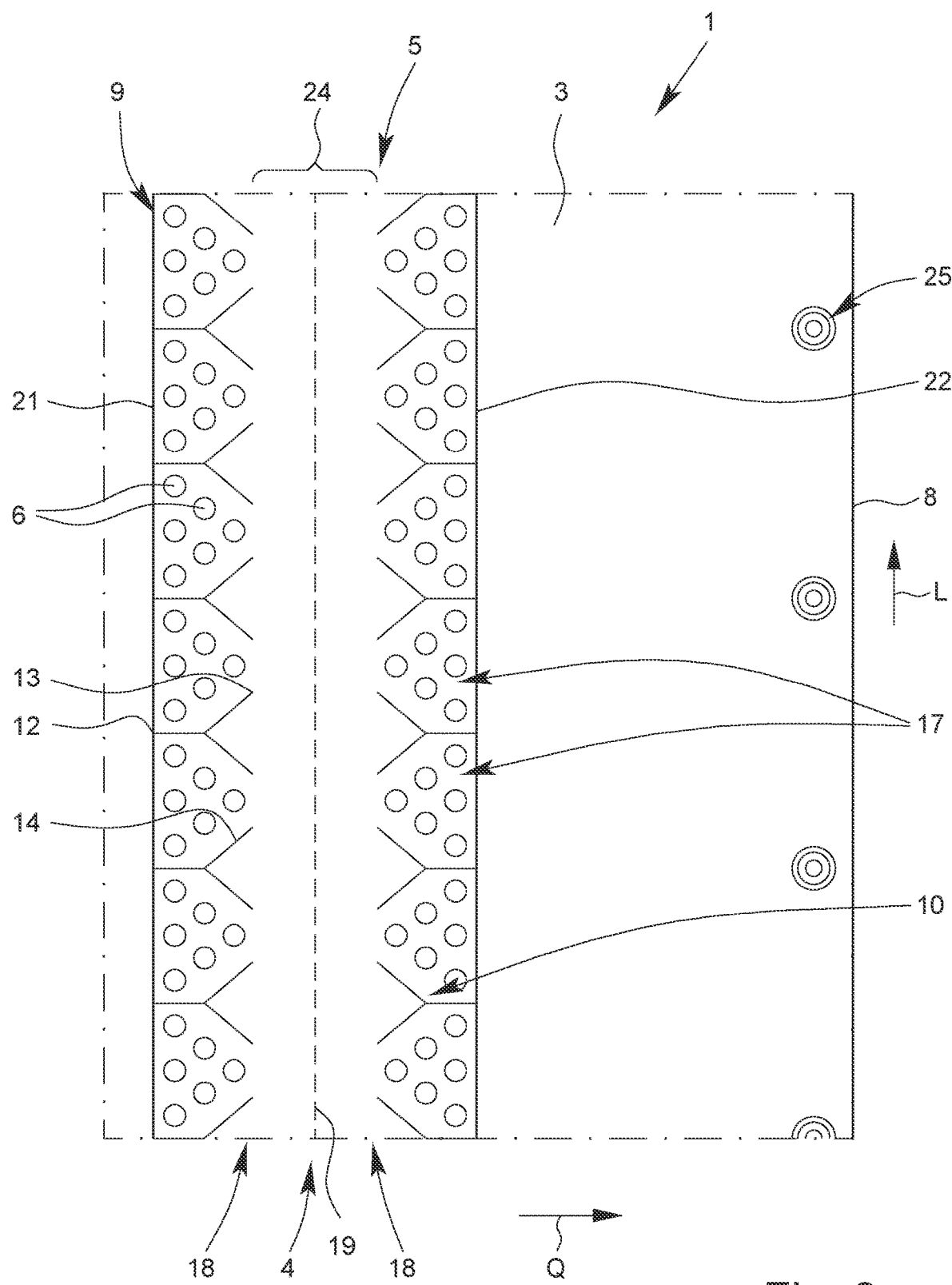
Figure 4:
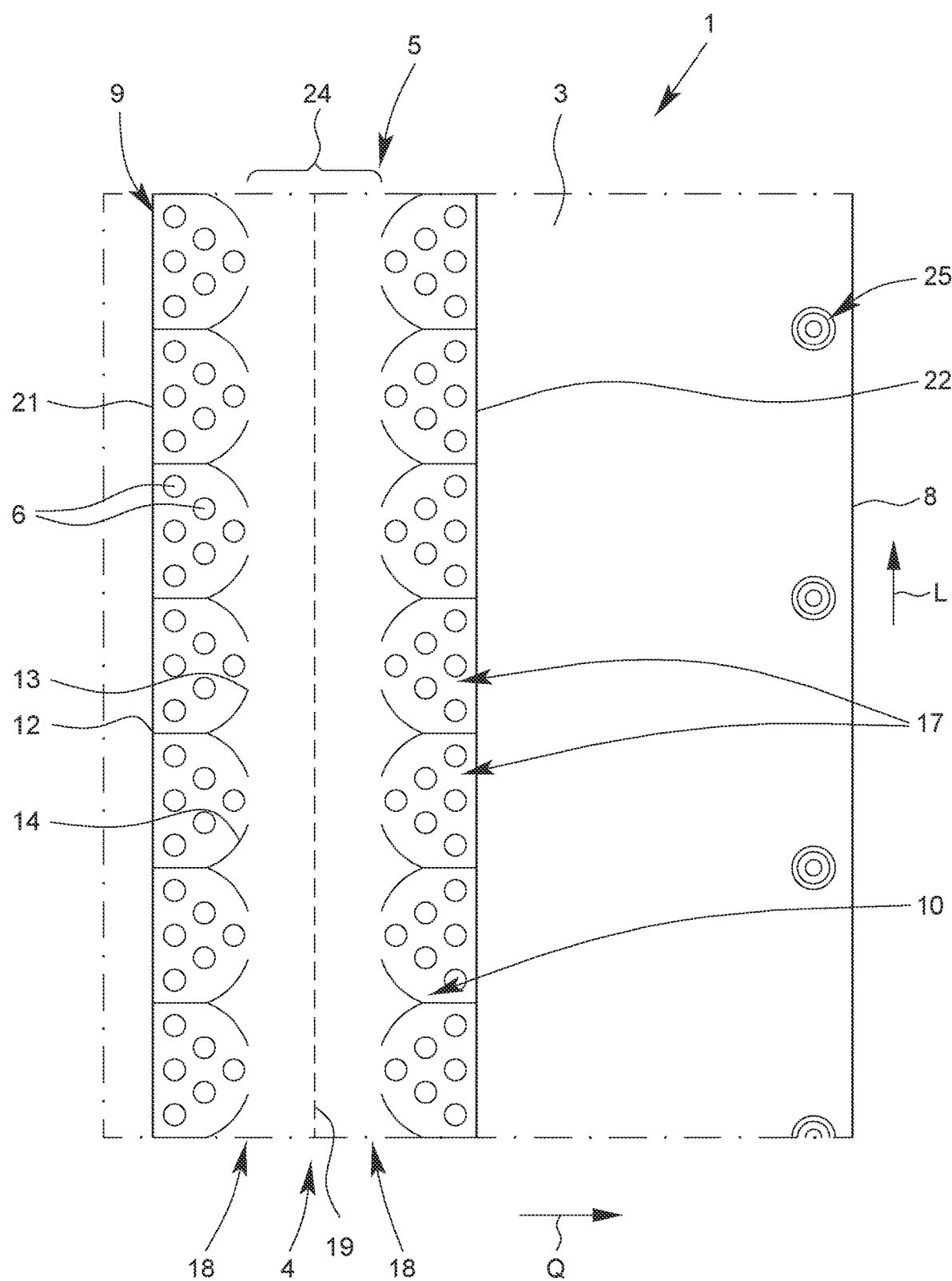

The weld start point 12 and the weld end point 13 can especially be located on the welding 14. This is shown schematically in FIG. 1 and FIGS. 3 to 5. The welding 14 can be designed straight as shown in FIG. 1 and FIG. 3 or curved as shown in FIG. 4. In the case of a curved design of the welding 14, it is especially intended that the welding 14 is designed at least essentially in the form of a curved section.

FIG. 2 shows a further embodiment in which no continuous welding 14 is realised. It is thereby provided that the weld start point 12 is arranged on a first welding line 15 and the weld end point 13 on a further welding line 16. The further welding line 16 is not only at a distance from the first welding line 15 in the illustrative example shown in FIG. 2, but is arranged offset and/or shifted to it—especially in relation to the longitudinal sheet direction L.

Furthermore, FIG. 2 shows that both the first and the further welding lines 15, 16 run at least essentially in cross direction Q of the sheet 1.

FIG. 1 shows that the cover film 9 extends continuously in the longitudinal sheet direction L and over the entire length of the basic film 3. Not shown is another embodiment in which the cover film 9 is designed to be continuous, but does not extend over the entire length of the basic film 3 in the longitudinal sheet direction L. Thus, the basic film may comprise 3 areas which do not include ventilation area 5. These areas do not have to be covered by the cover film 9—but they can be covered in other embodiments.

It is not shown that the cover film 9 can comprise individual sections which can especially attach one another and/or overlap one another. These individual sections of the cover film 9 can also be connected to the basic film 3 via connection areas 10.

FIG. 1 and FIG. 2 show that ventilation area 5 comprises a plurality of ventilation sections 17. The ventilation sections 17 are adjacent to each other and arranged one behind the other in the longitudinal sheet direction L. A ventilation section 17 may in particular contain a grouped arrangement of ventilation openings 6. A ventilation section 17 may include at least one ventilation opening 6. It is more preferably that all ventilation openings 6 and/or at least substantially all ventilation openings 6 are arranged in ventilation sections 17. In any case, at least 80% of the ventilation openings 6 are arranged in ventilation sections 17.

Furthermore, FIG. 1 shows that in each case and/or at least one connection area 10 is arranged between neighbouring ventilation sections 17. In the illustrative example shown in FIG. 1, neighbouring ventilation sections 17 are separated from each other by connection areas 10. Thereby each connection area 10 can comprise the weld start point 12 and the weld end point 13. The connection areas 10 as well as the ventilation sections 17 can be designed at least essentially identically or can differ from each other.

In the embodiment shown in FIG. 1, a regular and repetitive sequence of connection areas 10 and ventilation sections 17 is provided, running in the longitudinal sheet direction L.

FIGS. 1 and 3 show that the weldings 14 are designed to be inclined and/or sloping towards the immediately neighbouring ventilation section 17. In addition, two weldings 14 are provided in one connection area 10. Thereby the welding 14 inclined towards the directly neighbouring and/or adjacent ventilation section 17 is closer to the ventilation section 17 in question than the other welding 14 of the same connection area 10.

In the illustrative example shown in FIG. 2, it is also provided that the line connecting the weld start point 12 with the weld end point 13 is designed to be inclined and/or oblique towards the immediately neighbouring ventilation section 17. In the embodiment shown in FIG. 2, it is provided that in particular at least two lines can be formed by at least two weld end points 13, which, however, particularly refer to the same weld start point 12.

Figure 11:
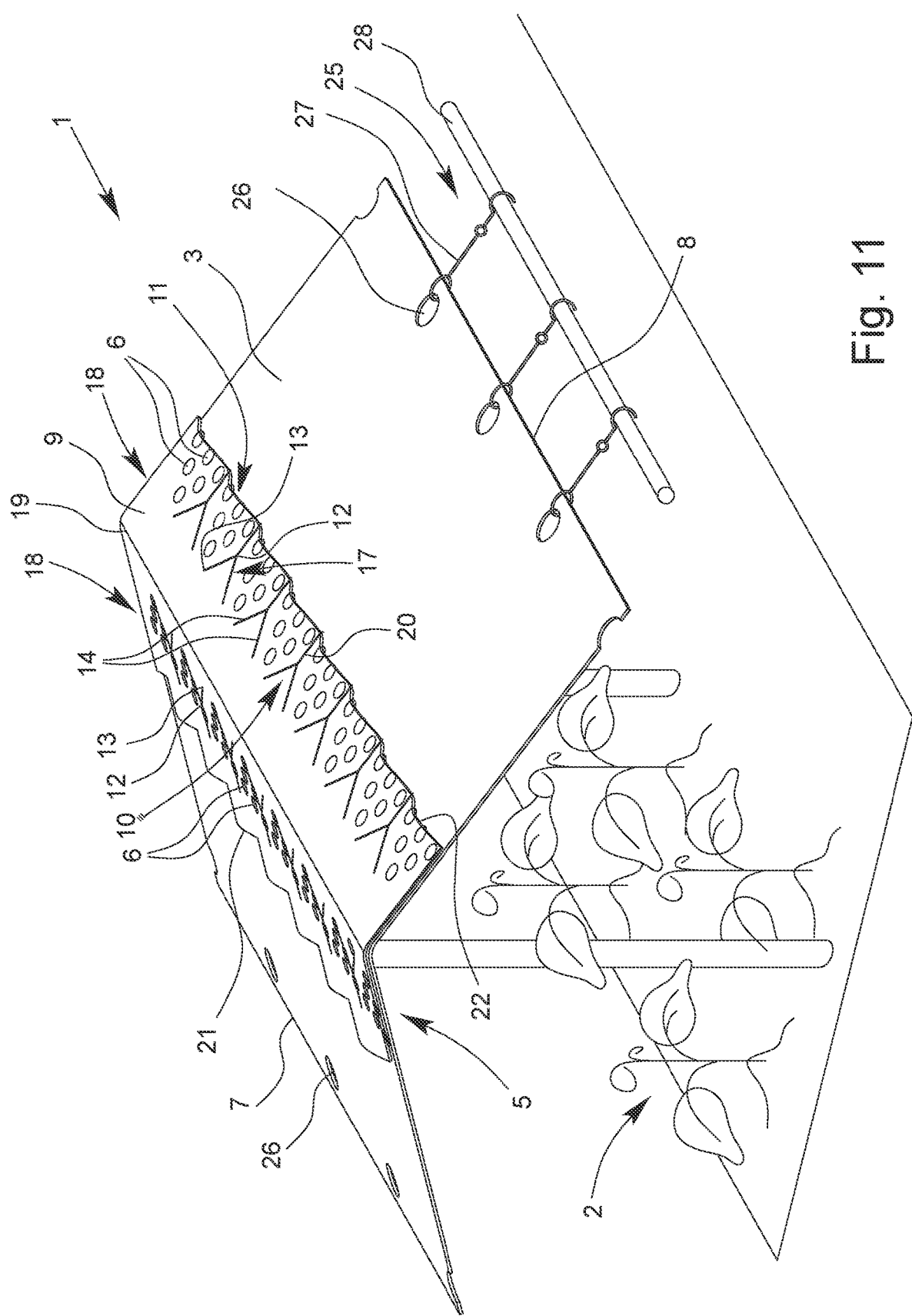

FIG. 11 shows that the free spaces 11 are each provided above a ventilation section 17 and the connection areas 10 are designed in such a way that the respective free space 11 tapers towards a longitudinal edge 7, 8 of the sheet. Thus, the free space 11 tapers especially towards the side facing away from the opening of the free space 11 and/or the longitudinal edge 7, 8 facing away from the opening of the free space 11. Finally, the ventilation can take place via the opening of the free space 11.

The free space 11 can especially be formed over a ventilation section 17 in such a way that the length of the basic film 3 running in the longitudinal sheet direction L is smaller than the length of the cover film 9 running in the longitudinal sheet direction L. The length of the cover film 9 can refer to the "pulled out" state. The greater length of the cover film 9 compared to the base film 3 results in a curvature of the cover film 9 over the ventilation section 17. The difference in length between the basic film 3 and the cover film 9 thus creates the free space 11 between the basic film 3 and the cover film 9. Especially, the cover film 9 is designed in its original state, not yet bonded to the basic film 3, to be at least 20% longer than the length of the covered area of the basic film 3.

FIG. 1 shows that the ventilation area 5 comprises two ventilation segments 18 which are opposite each other at least in some areas. The ventilation segments 18 can especially each comprise a plurality of ventilation sections 17. In the illustrative example shown in FIG. 1, it is provided that the ventilation segments 18 are designed mirror-symmetrically to a mirror axis running parallel to the longitudinal sheet direction L. In other designs, the mirror symmetry axis can also be formed by further axes.

In the embodiment shown in FIG. 11, one ventilation segment 18 forms a side surface of the gable roof. The ventilation segments 18 are finally separated from each other by a separating line 19. The separating line 19 can be the centre line of the basic film 3 and/or the sheet 1. In other embodiments it may also be provided that the separating line 19 is defined by the axis resulting from the support of sheet 1 on a rope, bar or the like.

For example, the separating line 19 can be defined by an axis of support. The separating line 19 need not be a physical line, fold or the like, it can be an imaginary axis.

In addition, the separating line 19 can also be the axis of symmetry for the mirror-symmetrical design of the ventilation segments 18. The separating line 19 can coincide with the centre line of the basic film 3—but does not have to.

In particular, both ventilation segments 18 are arranged in the central area 4 of the basic film 3.

The welding 14 or the welding lines 15, 16 can comprise different lengths as a function of the intended use. In particular, it is intended that the welding 14 and/or the first and/or further welding lines 15, 16 extend over at least 10%, especially between 30% and 80%, of the width of a ventilation section 17 running in cross direction Q and/or the width of the ventilation area 5 and/or the width of the ventilation segment 18. The widths of the above-mentioned areas refer especially to the width extending at least substantially in the cross direction Q.

In further embodiments, it may also be provided that the welding 14 and/or the first and/or further welding lines 15, 16 comprise a length of at least 10%, especially between 30% and 80%, of the width of a ventilation section 17 and/or width of the ventilation area 5 and/or width of the ventilation segment 18.

The length of welding 14 and/or of weld lines 15, 16 may refer to the total length which can be determined independently of the longitudinal sheet direction L and/or cross direction Q.

It is not shown that the welding 14 and/or the first and/or further welding lines 15, 16 are designed to be interrupted.

FIG. 1 shows that immediately neighbouring weldings 14 design a V-shape, at least in some areas. Thereby the respective legs of the V-shape, which are designed by the respective welding 14, can pass directly into each other to form a pointed corner of the V-shape or be spaced from each other. In the illustrative example shown in FIG. 1, it is intended that the pointed corner of the V-shape is designed.

Even if the weldings 14 are curved, a V-shape is designed between immediately neighbouring weldings 14 of a connection area 10—as shown schematically in FIGS. 4 and 5.

In addition, it may be provided that the connection area 10 includes a further welding 20 next to welding 14 or next to the first and/or further welding lines 15, 16. The further welding 20 can be at least essentially aligned in cross direction Q, as shown in FIG. 1 and FIGS. 3 to 5. The further welding 20 can merge into the weldings 14 of the connection area 10 or be at a distance from them.

Provided that the further welding 20 runs at least essentially in the cross direction Q, a V-shaped arrangement of neighbouring weldings 14 can especially enable a Y-shaped design of the connection area 10. A Y-shaped design is also understood to be one in which the further welding 20 is at a distance from the weldings 14, as shown in FIGS. 1 and 5.

Finally, FIGS. 1 and 3 to 5 show a Y-shaped design of the connection area 10, in which a further welding 20 interacts with the V-shape formed by the weldings 14.

It is not shown, that in further embodiments the further welding 20 can be inclined with respect to the cross direction Q. Alternatively or additionally, the further welding 20 can also be curved—at least partially.

FIGS. 1 and 2 show that the weld end point 13 can face the separating line 19. The weld start point 12 can especially face away from the separating line 19 and be arranged closer to a further longitudinal edge 8 of the basic film 3 and/or a longitudinal edge 22 of the cover film 9. The longitudinal edge 22 of the cover film 9 can especially be turned towards the further longitudinal edge 8 of the basic film 3. Especially, the free space 11 can be tapered towards the separating line 19.

The weldings 14 can also be arranged especially in the upper area of the respective ventilation segments 18 facing the separating line 19. Alternatively or additionally, it may be provided that the further welding 20 is arranged in the lower area of the ventilation segments 18 facing away from the separating line 19.

It can especially be provided that the opposite connection areas 10 of the respective ventilation segments 18 are designed to be at least essentially mirror-symmetrical. The separating line 19 and/or the centre line of the basic film 3 can be the mirror axis. Especially, the mirror axis runs at least essentially parallel to the longitudinal sheet direction L—at least in other embodiments.

In addition, the further welding 20 can be designed to be straight or curved as a whole or in certain areas. In the illustrative example shown, the further welding 20 is designed to be at least essentially straight and in cross direction Q.

FIGS. 1 and 2 and FIG. 5 show illustrative examples in which the connection area 10 comprises an intermediate ventilation channel 23. The intermediate ventilation channel 23 can especially be formed by a distance between the weldings 14 and the further welding 20. In the illustrative example shown in FIG. 2, the intermediate ventilation channel is finally formed by the spacing between the first and further welding lines 15, 16.

Furthermore, the further welding 20 can be provided in other embodiments in such a way that it extends over at least 5% of the width of a ventilation section 17 and/or the width of a ventilation area 5 and/or the width of a ventilation segments 18. Alternatively or additionally, it can be provided that the length, which can be independent of the longitudinal sheet direction L and/or the cross direction Q, of the further welding 20 corresponds to at least 5%, especially between 10% and 50%, of the width of a ventilation section 17 and/or the width of a ventilation area 5 and/or the width of a ventilation segments 18.

As explained above, it is especially intended that the width of the cover film 9 should be smaller than the width of the basic film 3. In addition, it may also be provided that the cover film 9 overlaps the ventilation area 5, especially on both sides, and especially serves to cover the ventilation openings 6.

In other embodiments, it may be provided that the width of the cover film 9, which extends particularly in the cross direction Q, corresponds to a maximum of 50%, especially a maximum of 30%, of the width of the basic film 3.

FIG. 11 shows in a schematic illustration that the cover film 9 lies on the basic film 3 in the area of a connection area 10, at least in some areas. Especially in the area of the connection area 10, the cover film 9 lies at least essentially tight and/or flat on the basic film 3. Preferably, the cover film 9 can also rest on the basic film 3 between the directly neighbouring weldings 14 of the respective connection area 10.

FIG. 3 shows that a central transition area 24 covered by the cover film 9 is provided between the ventilation segments 18. This transition area 24 can be designed free of welding(s) or welding sections and/or free of ventilation openings 6.

FIG. 11 shows that this transition area 24 can be used to rest on a tension cable or bar of a frame. An air exchange between the opposite ventilation sections 17 of the respective ventilation segments 18 can (but does not have to) be made possible via the transition area 14 in other embodiments.

In the illustrative example shown, it is intended that a ventilation section 17 comprises a plurality of ventilation openings 6. In particular between 3 and 10, especially 4 to 6, ventilation openings 6 are provided per ventilation section 17. The ventilation openings 6 can be arranged in rows. Preferably, the number of ventilation openings 6 may be reduced in the successive rows of a ventilation section 17, especially towards separating line 19. For example, the lowest row of the ventilation section 17 facing the nearest longitudinal edge 22 of the cover film 9 may comprise between 3 and 5 ventilation openings 6. For example, there may be between 3 to 6 rows. For example, the topmost row of ventilation section 17 facing away from the longitudinal edge 22 may have 1 to 2 ventilation openings 6.

FIG. 3 shows that the area of the ventilation section 17 belonging to the basic film 3, and/or the area it occupies between neighbouring connection areas 10, preferably on both sides, tapers towards separating line 19. This taper is also further illustrated by the decreasing number of ventilation openings 6 in the rows.

In this context it is obvious that the ventilation openings 6 can be designed as breakthroughs of the basic film 3.

FIG. 11 shows that the basic film 3 can comprise fastening means 25 on its longitudinal edges 7, 8. In the illustrative example shown, the fastening means 25 are formed by an opening 26 in the basic film 3 and by a hook 27 engaging in the opening 26. The hooks 27 can be fastened, for example, to a frame or to the support means 28. Such a support means 28 is also shown in a schematic illustration in FIG. 11. The support means 28 can be connected to the floor and/or supported by it.

It is not shown that neighbouring sheets 1 can also be connected to each other via fastening means 25 and preferably connected directly to each other—for example via hooks 27. As an alternative to hooks, for example, a tension belt or a tension cable is also possible.

It is not shown that the basic film 3 and/or the cover film 9 is/are designed to be at least partially, preferably completely, translucent and/or transparent. Light transmission is especially intended for visible light and/or daylight, preferably in a wavelength range between 400 nm and 700 nm.

In other embodiments, a thermoplastic material can be provided as the material for the cover film 9 and/or the basic film 3. Especially, the cover film 9 and/or the basic film 3 can be made of the thermoplastic material. The thermoplastic material can be a polyolefinic material, preferably polyethylene, soft polyethylene, linear low density polyethylene, ethylene-butyl-acrylate copolymer, ethylene-vinyl acetate and/or mixtures thereof.

It is not shown that the basic film 3 comprises a width of between 0.5 m and 40 m, especially between 1.5 m and 15 m. The width of the basic film 3 can be varied as a function of the intended use, for example for greenhouses or for covering vines and/or soft fruit.

The cover film 9 can comprise a width of at least 10 cm, especially between 0.4 m and 1.0 m.

In addition, the sheet 1 can be supplied rolled up and comprise a length of between 10 m and 800 m.

It is not shown that the basic film 3 and/or the cover film 9 is/are designed to be breathable. Especially the cover film may comprise 9 micro-perforations, which may lead to a better air circulation, especially to an improved ventilation of the covered area.

Furthermore, heat-absorbing additives can be added to the material of the cover film 9. This also improves the air circulation.

FIG. 11 schematically shows the use of a sheet 1 according to one of the embodiments described earlier in the agricultural sector. The sheet 1 is preferably used to cover cultivated plants 2, as shown in FIG. 11. The use of the sheet 1 is especially for protection against rain and/or weather and/or for ventilation of the covered area.

Figure 30:
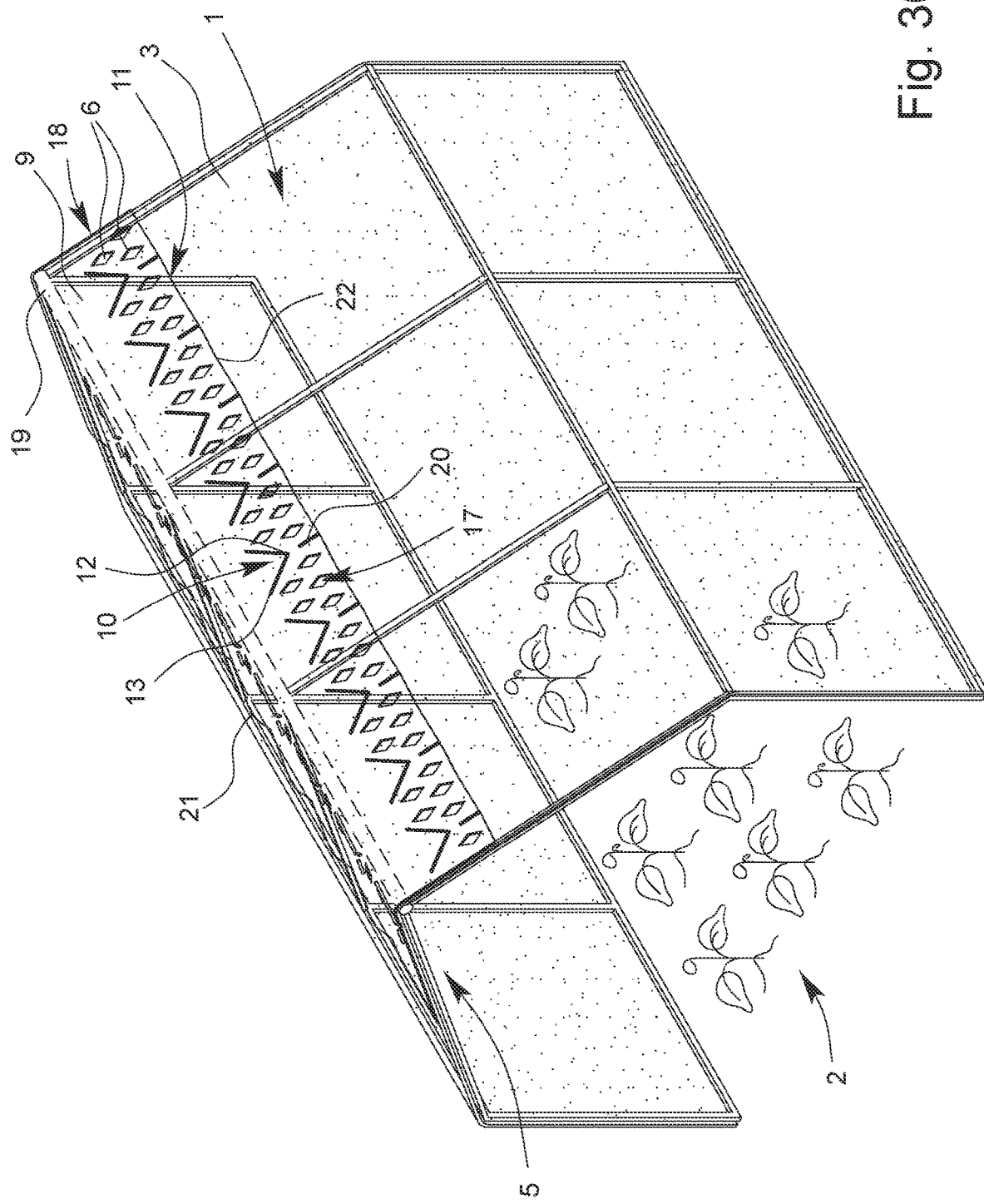

FIG. 30 shows, that the sheet 1 can be used in greenhouses, preferably as external cover.

The following describes a further form of execution which can also be realised on its own, i.e. without the oblique and/or sloping weldings described earlier, and which has its own inventive significance. It is understood in this context that the features, characteristics or advantages described earlier also apply in the same way to the embodiment described below, without this requiring further explicit mention.

At the same time, the features or characteristics described below can also be applied to the embodiments described earlier without the need for further explicit mention.

Figure 12:
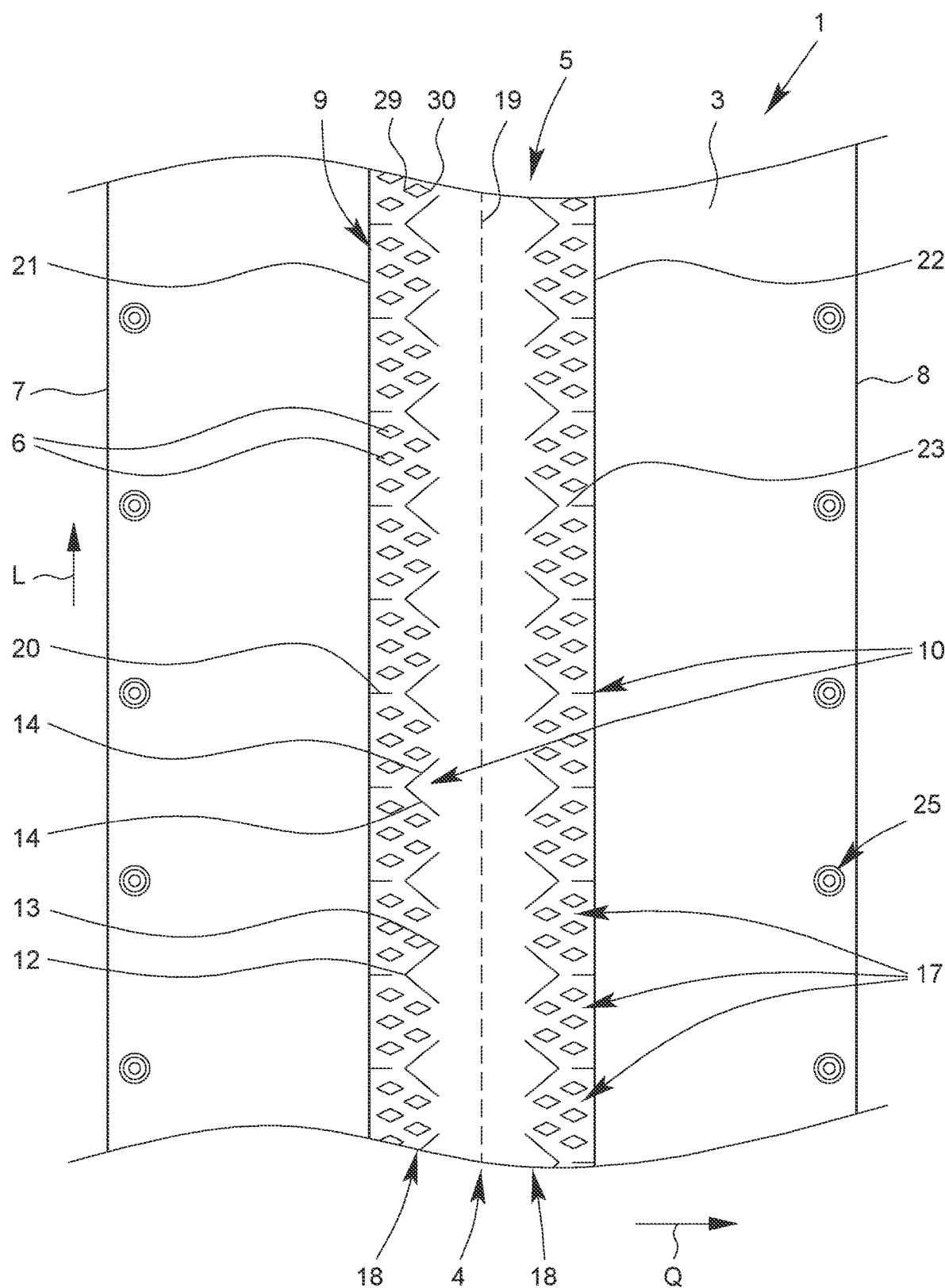

FIG. 12 shows an elongated sheet 1 for covering cultivated plants 2 with a basic film 3 made of plastic.

In the central area 4 of the basic film 3 there is a ventilation area 5 extending in the longitudinal sheet direction L, which can be used to ventilate the covered area when the sheet 1 is in use. The ventilation area 5 comprises a plurality of ventilation openings 6.

FIG. 12 also shows that two opposite corners 29, 30 of at least one ventilation opening 7 are provided in the cross direction Q of sheet 1, which runs at least substantially orthogonally to the longitudinal sheet direction L.

The at least one ventilation opening 7 may comprise further corners. Directly opposite further corners may, for example, be arranged at least substantially in the longitudinal sheet direction L, as shown in FIG. 12.

The opposite corners 29, 30 are especially arranged in such a way that the line connecting the opposite corners 29, 30 runs at least essentially in cross direction Q.

The line connecting the corners 29, 30 can also be designed to be (slightly) inclined in relation to the cross direction Q and, in particular, can form a first angle to the cross direction of maximum+/−45°, even more preferably maximum+/−300 and especially maximum+/−10°. In this context, it is understood that the first angle is between the line connecting the opposite corners 29, 30 and the cross direction Q and refers especially to the smaller angle included. Finally, there is also a further angle, which is 1800 minus the size of the first angle.

The corners 29, 30 can especially be arranged in such a way that the ventilation opening 6 does not comprise any further corner or any further section or area which protrudes opposite the respective corner 29, 30—in relation to the respective immediately neighbouring longitudinal edge 7, 8 of the basic film 3. Especially no further corner or further section/area of the ventilation opening 6 is closer to the respective immediately adjacent longitudinal edge 7, 8 of the basic film 3. Such an overhang would in particular mean that if the sheet 1 is pulled in the cross direction Q with a tensile force, this overhanging area would first hit a tension cable or bar of a frame, for example.

In the end, sheet 1 is pulled in the state of use, especially in the cross direction Q, onto a tension cable, bar or the like. The tensile force thereby acts mostly at least essentially in the cross direction Q.

Thus, the corners 29, 30 can form the outermost boundary points of the ventilation opening 6 in relation to the respective immediately neighbouring longitudinal edge 7, 8 of the basic film 3.

FIGS. 13 to 24 show different embodiments of possible forms of the ventilation opening 6.

In the embodiments shown in FIGS. 13 to 24 the cross direction Q is (schematically) drawn in. This serves as a schematic illustration of the orientation of the ventilation opening 6 on/in the basic film 3.

Figure 22:
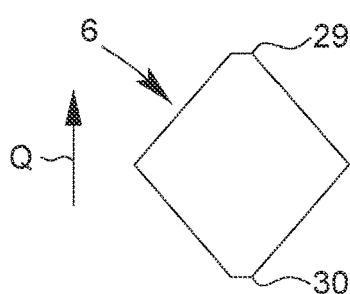

In the illustrative example shown in FIG. 22 it is provided that further corners 31 are at least essentially aligned with the respective neighbouring corner 29, 30 and/or are at a height to this in relation to the cross direction Q.

However, it is preferred if the corners 29, 30 form the outermost boundary points to the respective adjacent longitudinal edge 7, 8 of the basic film 3 and/or no further section/area and/or no further corner 31 is aligned with the respective corner 29, 30, is at the same height in relation to the cross direction Q or protrudes beyond it, especially in relation to the respective immediately adjacent longitudinal edge 7, 8 of the basic film 3.

Figure 13:
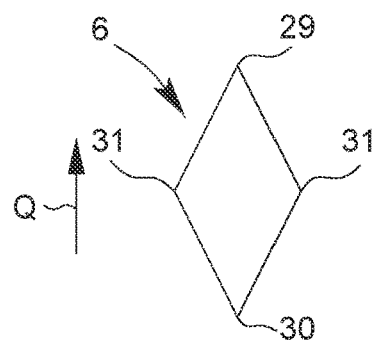

FIG. 13 shows that the opposite corners 29, 30 are designed to be at least essentially pointed and/or end in a point whose apex may also comprise a curve with a small radius.

Figure 21:
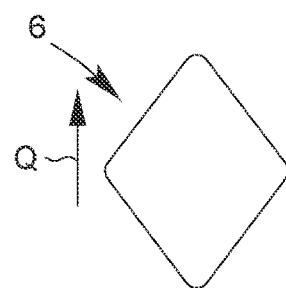

FIG. 21 shows schematically that the opposite corners 29, 30 can also be designed with a rounded edge.

The design shown in FIG. 12 also provides that a plastic cover film 9 running in the longitudinal sheet direction L of the basic film 3 is applied to the ventilation area 5, forming free spaces 11 for air exchange, and is firmly welded to the basic film 3 over a plurality of connection areas 10 following one another in the longitudinal sheet direction L.

Above this, it is particularly preferred if the ventilation opening 6 comprises a design that is at least substantially elongated in the cross direction Q. An elongated design is especially understood to mean that the length running in the cross direction Q is greater than the width of the ventilation opening 6 running in the longitudinal sheet direction L.

FIG. 13 shows that the ventilation opening 6 is designed as a rhombus.

In addition, the ventilation opening may comprise 6 straight or curved outer borders, as shown schematically in FIGS. 13 to 24.

Figure 14:
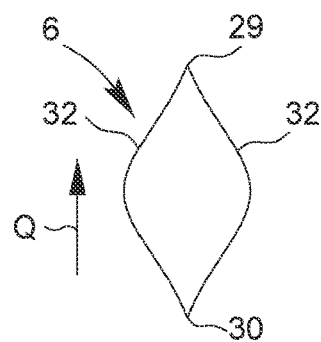

FIG. 14 shows a ventilation opening 6 with opposite pointed corners 29, 30, wherein the outer borders connecting the corners 29, 30 are designed 32 curved.

Figure 15:
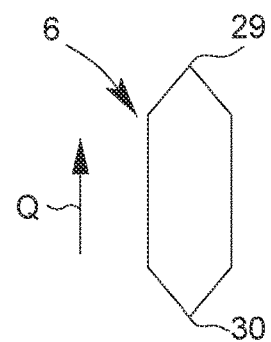
Figure 16:
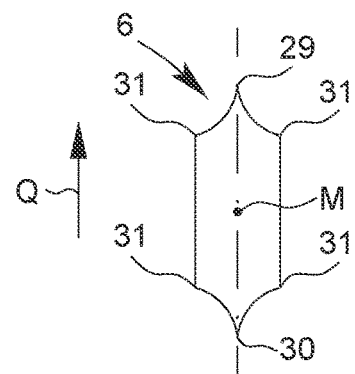

FIG. 15 and FIG. 16 each show a ventilation opening 6 designed as a hexagon, wherein the design shown in FIG. 15 has at least essentially straight outer boundary edges. In the design shown in FIG. 16, the legs of the outer boundary immediately adjacent to the corners 29, 30 are designed to be at least essentially in the shape of sections of an arc.

Figure 17:
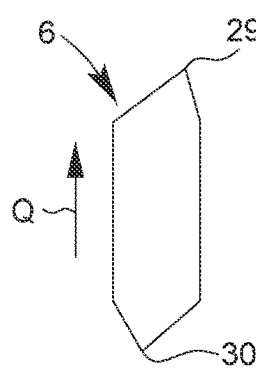
Figure 18:
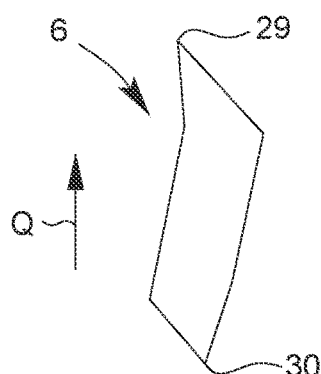

FIGS. 17 and 18 each also show a ventilation opening 6 designed as a hexagon, which especially is neither symmetrical nor rotationally symmetrical.

In other designs it may be provided that the ventilation opening 6 is designed to be mirror-symmetrical at least to at least one mirror axis.

Alternatively or in addition, other embodiments may provide for the ventilation opening 6 to be designed to be rotationally symmetrical.

Figure 19:
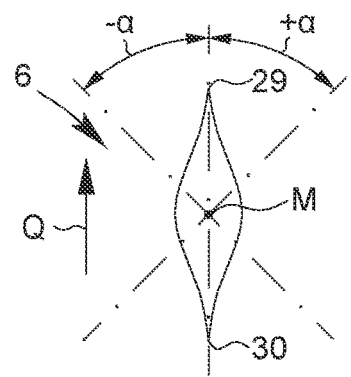
Figure 20:
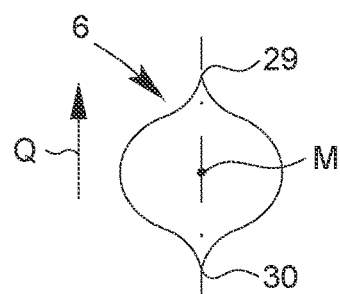

FIGS. 19 and 20 show ventilation openings 6 of different widths.

Figure 23:
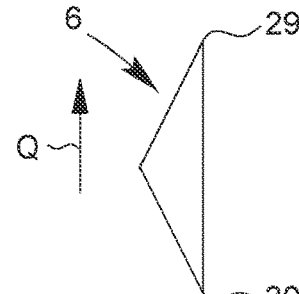

FIG. 23 shows an isosceles, obtuse triangle-shaped ventilation opening 6.

Figure 24:
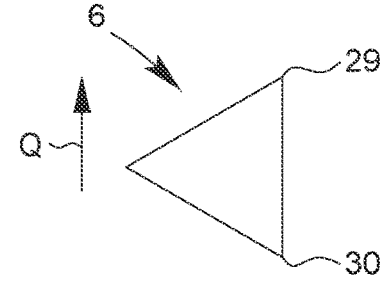

FIG. 24, however, shows a ventilation opening 6 in the form of an equilateral triangle.

It is particularly preferred if the opposite corners 29, 30 are arranged not offset to each other in relation to the cross direction Q. A staggered and/or shifted arrangement, as schematic illustration in FIG. 17, can also be provided in principle.

FIG. 19 shows schematically that the ventilation opening 6 comprises only the opposite corners 29, 30 as outer corners at an angle α starting from the line connecting the opposite corners 29, 30 of at least +/−45°, preferably of at least +/−80°. The centre point M of the ventilation opening 6 thereby serves as the starting point for the above-mentioned determination of the angle.

Preferably, the ventilation opening 6 comprises a maximum length of at least 1 mm, especially between 4 mm and 80 mm. The length of the ventilation opening 6 is aligned in the cross direction Q, especially in the state of use.

The ventilation opening 6 can comprise a maximum width of at least 0.5 mm.

In addition, other designs may also provide that the ventilation opening 6 comprises an area of at least 0.01 cm$^2$, especially between 1 cm$^2$ and preferably 3 cm$^2$.

Furthermore, the opposite corners 29, 30 shown in the afore-mentioned illustrative examples each comprise an angle of at least 10°. Especially this angle is between 30° and 900.

A further execution example is described below. It is understood in this context that the features, characteristics or advantages described earlier also apply in the same way to the design described below, without this requiring further explicit mention.

At the same time, the features or characteristics described below can also be applied to the designs described earlier without the need for further explicit mention.

In the case of an even more preferably even independently realisable execution example, i.e. without oblique weldings and/or without ventilation openings 6 having the corners 29, 30, an elongated sheet 1 is provided for covering cultivated plants 2. The elongated sheet 1 comprises a basic film 3 made of plastic. Especially the sheet 1 is designed according to one of the previous designs.

In the central area 4 of the basic film 3 a ventilation area 5 extending in the longitudinal sheet direction L is provided with a plurality of ventilation openings 6. A plastic cover film 9, extending in the longitudinal sheet direction L of the basic film 3, is applied on the ventilation area 5 in such a way that free spaces 11 for air exchange are formed. The cover film 9 is firmly welded to the basic film 3 over a plurality of connection areas 10 consecutive in the longitudinal sheet direction L.

With this sheet 1, it is then provided that the sum of the areas of all ventilation openings 6 is at least 1%, especially between 1.1% and 3%, of the total area of the basic film 3. Further aspects of the present invention which are realisable independently and/or in combination with the aspects and features described before are especially:

1. Elongated sheet (1) for covering cultivated plants (2), with a basic film (3) of plastic, wherein a ventilation area (5) extending in the longitudinal sheet direction (L) and having a plurality of ventilation openings (6) is provided in the central area (4) of the basic film (3), wherein at least one ventilation opening (6) comprises two opposite corners (29, 20) of the ventilation opening (6) in a cross direction (Q) of the sheet (1) extending at least substantially orthogonally to the longitudinal sheet direction (L).

2. Sheet according to aspect 1, characterised in that the opposite corners (29, 30) are arranged in such a way that the line connecting the opposite corners (29, 30) runs at least substantially in the cross direction (Q) and/or in that the line connecting the opposite corners (29, 30) encloses a first angle to the transverse direction (Q) of at most +/−45°, even more preferably at most +/−300 and especially at most +/−10°, and/or in that the opposite outer corners (29, 30) are arranged in such a way that the ventilation opening (6) comprises, in relation to the respective immediately adjacent longitudinal edge (7, 8) of the basic film (3), no further corner or no further region which projects with respect to the respective outer corner (29, 30) and/or is aligned with the latter.

3. Sheet according to aspect 1 or 2, characterised in that the opposite corners (29, 30) are each designed to be pointed or rounded.

4. Sheet according to one of the aspects 1 to 3, characterised in that the ventilation opening (6) comprises a design which is elongated at least substantially in cross direction (Q).

5. Sheet according to one of the aspects 1 to 4, characterised in that the ventilation opening (6) is at least substantially rhombus-shaped.

6. Sheet according to one of the aspects 1 to 5, characterized in that the ventilation opening (6) comprises a maximum length of at least 1 mm, preferably between 2 mm to 200 mm, more preferably between 4 mm to 80 mm, and/or that the ventilation opening (6) comprises a maximum width of at least 0.5 mm, preferably between 1 mm to 100 mm, more preferably between 2 mm to 40 mm.

7. Sheet according to one of the aspects 1 to 6, characterised in that the corner (29, 30) forms an angle of at least 10°, preferably between 200 to 100°, more preferably between 30° to 90°.

8. Sheet according to one of the aspects 1 to 7, characterized in that a cover film (9) of plastic, running in the longitudinal direction of the basic film (3), is applied to the ventilation area (5) in such a way that free spaces (11) for an air exchange are formed, wherein the cover film (9) is firmly welded to the basic film (3) over a plurality of connection areas (10) following one another in the longitudinal sheet direction (L).

9. Sheet according to one of the aspects 1 to 8, characterised in that the connection area (10) is designed to be inclined, at least in some areas, with respect to a weld start point (12) and a weld end point (13) with respect to the cross direction (Q) running orthogonally to the longitudinal sheet direction (L), especially wherein the line connecting the weld start point (12) with the weld end point (13) encloses an angle to the transverse direction (Q) of at least 5°, preferably between 5° and 70°, even more preferably between 300 and 50°.

10. Sheet according to one of the aspects 1 to 9, characterised in that the ventilation area (5) comprises a plurality of neighbouring ventilation sections (17) arranged one behind the other in the longitudinal sheet direction (L), wherein at least one ventilation section (17) comprises at least one ventilation opening (6), in particular wherein in each case and/or at least one connection area (10) is arranged between neighbouring ventilation sections (17) and/or in particular wherein one ventilation section (17) is enclosed by at least two connection sections (10) and/or weldings (14).

11. Sheet according to one of the aspects 1 to 10, characterised in that the ventilation section (17) comprises a plurality of ventilation openings (6), preferably at least substantially identically formed, in particular between 2 to 30, preferably between 3 to 10, in particular wherein the ventilation openings (6) are arranged in rows, preferably in rows running parallel to the longitudinal sheet direction (L).

12. Sheet according to one of the aspects 1 to 11, characterised in that the basic film (3) has a width of between 0.5 to 40 m, preferably between 1 to 20 m, preferably between 1.5 to 15 m, and/or in that the cover film (9) has a width of at least 10 cm, preferably between 10 cm to 2 m, more preferably between 0.4 to 1 m.

13. Sheet according to one of the aspects 1 to 12, characterised in that the sheet (1) has a length of at least 1 m, preferably between 2 to 1000 m, more preferably between 10 to 800 m.

14. Elongated sheet (1) for covering cultivated plants (2), with a basic film (3) of plastic, especially according to one of the preceding aspects, wherein a ventilation area (5) extending in the longitudinal sheet direction (L) and having a plurality of ventilation openings (6) is provided in the central area (4) of the basic film (3), wherein a plastic cover film (9) extending in the longitudinal sheet direction (L) of the basic film (3) is applied to the ventilation area (5), forming free spaces (11) for air exchange, and is firmly welded to the basic film (3) over a plurality of connection areas (10) following one another in the longitudinal sheet direction (L), and wherein the sum of the areas of all ventilation openings (6) corresponds to at least 1%, preferably between 1.1% and 3%, of the total area of the basic film (3).

15. Use of a sheet (1) according to one of the preceding aspects in the agricultural sector, preferably for the covering of cultivated plants (2), preferably for protection against rain and/or weather conditions and/or for ventilation and/or aeration of the covered area.

LIST OF REFERENCE SIGNS 1 sheet
2 cultivated plants
3 basic film
4 central area of 3
5 ventilation area
6 ventilation opening
7 longitudinal edge
8 further longitudinal edge
9 cover film
10 connection area
11 free space
12 weld start point
13 weld end point
14 welding
15 first welding line
16 further welding line
17 ventilation section
18 ventilation segment
19 separating line
20 further welding
21 longitudinal edge of 9
22 longitudinal edge of 9
23 intermediate ventilation channel
24 transition area
25 fastening means
26 opening
27 hooks
28 support means
29 corner
30 corner
31 further corner
32 border
L longitudinal sheet direction
M centre point
Q cross direction

The invention claimed is:
1. An elongated sheet configured to provide a covered area for agricultural cultivated plants comprising:
a basic film of plastic,
wherein a ventilation area extending in a longitudinal sheet direction and having a plurality of ventilation openings is provided in a central area of the basic film,
wherein a cover film of plastic extending in the longitudinal sheet direction of the basic film is applied to the ventilation area, forming free spaces for air exchange, the cover film welded to the basic film over a plurality of connection areas following one another in the longitudinal sheet direction, wherein at least a portion of the plurality of the connection areas are angled with an offset from a weld start point to a weld end point relative to a direction extending orthogonally to the longitudinal sheet direction, the at least the portion of the plurality of connection areas are configured to improve one or more of ventilation and deaeration of the covered area, and wherein:

the weld start point is connected to the weld end point via a welding, and the welding includes a first welding line and a second, different welding line, and the first and the second welding lines form a V-shape, or at least one connection area of the plurality of connection areas includes at least one further welding extending orthogonally to the longitudinal sheet direction, wherein the further welding is arranged between two neighbouring ventilation sections is at least substantially straight, and wherein a Y-shaped formation is made by the further welding.

2. The sheet according to claim 1, wherein a line drawn between the weld start point to the weld end point forms an angle, and an offset of this angle is between 5° and 70°.

3. The sheet according to claim 1, wherein at least one of the plurality of connection areas comprises at least one continuous welding extending obliquely relative to the direction extending orthogonally to the longitudinal sheet direction.

4. The sheet according to claim 1, wherein the cover film extends continuously in one or more of the longitudinal sheet direction and over an entire length of the basic film, wherein the cover film completely covers the ventilation area.

5. The sheet according to claim 1, wherein the ventilation area comprises a plurality of neighbouring ventilation sections arranged adjacent one another in the longitudinal sheet direction, wherein at least one ventilation section of the plurality of neighbouring ventilation sections comprises at least one ventilation opening of the plurality of ventilation opening, wherein at least one connection area of the plurality of connection areas is arranged between neighbouring ventilation sections and wherein at least one ventilation section is enclosed by at least two weldings.

6. The sheet according to claim 1, wherein the ventilation area comprises two ventilation segments which, relative to the longitudinal sheet direction, are located opposite mirror-symmetrical to one another, wherein one ventilation segment comprises a plurality of the neighbouring ventilation sections.

7. The sheet according to claim 1, wherein the first and second welding lines extend over at least 10% of a width of a ventilation section of the two neighbouring ventilation sections.

8. The sheet according to claim 1, wherein a ventilation section of the two neighbouring ventilation sections comprises a plurality of ventilation openings, wherein the plurality of ventilation openings are arranged in rows running parallel to the longitudinal sheet direction.

9. The sheet according to claim 1, wherein an area of a ventilation section of the two neighbouring ventilation sections of the basic film, or a base area thereof occupied between neighbouring connection areas, tapers towards a center line that divides the sheet in a longitudinal direction.

10. The sheet according to claim 1, wherein the basic film has a width of between 0.5 and 40 m, and the cover film has a width of at least 10 cm.

11. The sheet according to claim 1, wherein the sheet is at least 1 meter in length.

12. An elongated sheet configured to cover plants comprising:

a plastic film having a ventilation area extending in a longitudinal sheet direction with a plurality of ventilation openings in a central area of the plastic film, and a cover film of plastic extending in the longitudinal sheet direction applied to the ventilation area, forming free spaces for air exchange, the cover film welded to the plastic film at a plurality of connection areas following one another in the longitudinal sheet direction, wherein at least a portion of the plurality of the connection areas are angled with an offset from a weld start point to a weld end point relative to a direction extending orthogonally to the longitudinal sheet direction to form either a V-shaped or a Y-shaped weld between two neighbouring ventilation sections, the plurality of connection areas configured to improve one or more of ventilation and deaeration of a covered area.

13. The sheet of claim 12, further comprising a plurality of ventilation openings located in another area of the plastic film.

14. The sheet of claim 12, wherein at least one of the plurality of connection areas have a V or Y-shaped configuration.

15. The sheet of claim 14, wherein a plurality of the plurality of ventilation openings are located between the V or Y-shaped connection areas.

16. The sheet of claim 12, where a space exists between the plastic film and the cover film.

* * * * *

UNITED STATES PATENT AND TRADEMARK OFFICE
CERTIFICATE OF CORRECTION

PATENT NO. : 11,684,026 B2  
APPLICATION NO. : 17/407289  
DATED : June 27, 2023  
INVENTOR(S) : Asterios Daios Page 1 of 1

It is certified that error appears in the above-identified patent and that said Letters Patent is hereby corrected as shown below:

On the Title Page

Item (72) "Inventors", Column 1, Line 8, please delete "Salonika" and insert -- Thessaloniki --, therefore.

Signed and Sealed this  
Twenty-ninth Day of August, 2023

Katherine Kelly Vidal  
*Director of the United States Patent and Trademark Office*